United States Patent
Tamaura

(10) Patent No.: US 10,006,666 B2
(45) Date of Patent: Jun. 26, 2018

(54) SOLAR HEAT COLLECTING APPARATUS AND SOLAR HEAT COLLECTING METHOD

(71) Applicants: SolarFlame Corporation, Tokyo (JP); Mihama Corporation, Tokyo (JP)

(72) Inventor: Yutaka Tamaura, Tokyo (JP)

(73) Assignees: SOLARFLAME CORPORATION, Tokyo (JP); MIHAMA CORPORATION, Tokyo (JP)

( * ) Notice: Subject to any disclaimer, the term of this patent is extended or adjusted under 35 U.S.C. 154(b) by 195 days.

(21) Appl. No.: 14/435,657

(22) PCT Filed: Oct. 18, 2013

(86) PCT No.: PCT/JP2013/006189
§ 371 (c)(1),
(2) Date: Apr. 14, 2015

(87) PCT Pub. No.: WO2014/061281
PCT Pub. Date: Apr. 24, 2014

(65) Prior Publication Data
US 2015/0260430 A1    Sep. 17, 2015

(30) Foreign Application Priority Data

Oct. 18, 2012 (JP) .................... 2012-231033
Oct. 18, 2012 (JP) .................... 2012-231098
(Continued)

(51) Int. Cl.
*G02B 7/183* (2006.01)
*F24J 2/38* (2014.01)
(Continued)

(52) U.S. Cl.
CPC . *F24J 2/38* (2013.01); *F24J 2/07* (2013.01); *F24J 2/16* (2013.01); *F24J 2/5241* (2013.01);
(Continued)

(58) Field of Classification Search
None
See application file for complete search history.

(56) References Cited

U.S. PATENT DOCUMENTS 4,172,443 A * 10/1979 Sommer ............... F24J 2/10
126/578
5,979,438 A    11/1999 Nakamura
(Continued)

FOREIGN PATENT DOCUMENTS

DE    102004018151 A1    10/2005
DE    102008025814 A1    12/2009
(Continued)

OTHER PUBLICATIONS

English Machine Translation of Hendrik, DE 10 2008 025 814 A1. Dec. 3, 2009. 16 pages.*
(Continued)

*Primary Examiner* — Derek S Chapel
(74) *Attorney, Agent, or Firm* — Oliff PLC

(57) ABSTRACT

Solar heat collecting apparatus, wherein plural reflecting mirrors are disposed in north-south direction; the plural reflecting mirrors are provided with heliostat mechanism; the heliostat mechanism includes an east-west angle adjustment unit, having a rotating ring, to adjust the angle of reflecting surface of the plural reflecting mirrors in the east-west direction, and a north-south angle adjustment unit, having actuators, to adjust angle of reflecting surface of the plural reflecting mirrors in the north-south direction; the angle of reflecting surface of the plural reflecting mirrors on each reflection line is simultaneously adjusted via the frame by rotation of the rotating ring; the angle of reflecting surface of each reflecting mirror is individually adjusted by a back-and-forth motion of an arm of the corresponding actuator; and, each reception line is provided with a receiver,
(Continued)

and the receiver collects heat from the reflected light of the sunlight reflected by the plural reflecting mirrors.

20 Claims, 20 Drawing Sheets

(30) Foreign Application Priority Data

| | | |
|---|---|---|
| Oct. 18, 2012 | (JP) | 2012-231170 |
| Jan. 9, 2013 | (JP) | 2013-001967 |
| Jan. 9, 2013 | (JP) | 2013-002122 |

(51) Int. Cl.

| | |
|---|---|
| *F24J 2/07* | (2006.01) |
| *F24J 2/16* | (2006.01) |
| *F24J 2/52* | (2006.01) |
| *F24J 2/54* | (2006.01) |
| *F24J 2/48* | (2006.01) |
| *F24J 2/00* | (2014.01) |

(52) U.S. Cl.
CPC .......... *F24J 2/5424* (2013.01); *F24J 2/5427* (2013.01); *G02B 7/183* (2013.01); *F24J 2/484* (2013.01); *F24J 2002/003* (2013.01); *F24J 2002/5437* (2013.01); *F24J 2002/5468* (2013.01); *Y02E 10/41* (2013.01); *Y02E 10/47* (2013.01)

(56) References Cited

U.S. PATENT DOCUMENTS

| | | | | |
|---|---|---|---|---|
| 9,182,146 B2* | 11/2015 | Tamaura | | F24J 2/07 |
| 2005/0034752 A1* | 2/2005 | Gross | | F24J 2/38 |
| | | | | 136/246 |
| 2006/0201498 A1* | 9/2006 | Olsson | | F24J 2/16 |
| | | | | 126/605 |
| 2009/0056699 A1* | 3/2009 | Mills | | F24J 2/07 |
| | | | | 126/600 |
| 2010/0193013 A1 | 8/2010 | Kong | | |
| 2010/0258110 A1 | 10/2010 | Krabbe et al. | | |
| 2011/0126378 A1 | 6/2011 | Ota | | |
| 2011/0146663 A1 | 6/2011 | Ezawa et al. | | |
| 2012/0125401 A1 | 5/2012 | DeVillier | | |
| 2012/0125404 A1* | 5/2012 | Dos Santos Teixeira Ramos | | F24J 2/1047 |
| | | | | 136/246 |
| 2012/0325314 A1* | 12/2012 | Cheung | | F24J 2/38 |
| | | | | 136/259 |
| 2015/0096552 A1* | 4/2015 | Satoh | | F24J 2/10 |
| | | | | 126/600 |

FOREIGN PATENT DOCUMENTS

| | | |
|---|---|---|
| JP | S49-110069 A | 10/1974 |
| JP | 2003/322418 A | 11/2003 |
| JP | 2009-010324 A | 1/2009 |
| JP | 2010-101594 A | 5/2010 |
| JP | 3162841 U | 8/2010 |
| JP | 2010-539725 A | 12/2010 |
| JP | 2010286200 A | 12/2010 |
| JP | 2012063086 A | 3/2012 |
| JP | 2013-194936 A | 9/2013 |
| WO | 02/070966 A1 | 9/2002 |
| WO | 2010026673 A1 | 3/2010 |
| WO | 2010050107 A1 | 5/2010 |
| WO | 2011055719 A1 | 5/2011 |
| WO | 2012009470 A1 | 1/2012 |
| WO | 2012042888 A1 | 4/2012 |

OTHER PUBLICATIONS

Jan. 21, 2014 International Search Report issued in International Application No. PCT/JP2013/006189.
May 24, 2016 Extended Search Report issued in European Patent Application No. 13847995.1.
Jul. 5, 2016 Office Action issued in Japanese patent Application No. 2012-231033.
Sep. 6, 2016 Office Action issued in Japanese Patent Application No. 2013-001967.
Sep. 6, 2016 Office Action issued in Japanese Patent Application No. 2013-002122.
Oct. 4, 2016 Office Action issued in Japanese Patent Application No. 2012-231033.
Apr. 21, 2015 International Preliminary Report on Patentability issued in International Patent Application No. PCT/JP2013/006189.
Mar. 14, 2014 Office Action issued in Japanese Patent Application No. 2012-231033.
Mar. 7, 2017 Office Action issued in Japanese Patent Application No. 2013-001967.
Mar. 7, 2017 Office Action issued in Japanese Patent Application No. 2013-002122.

* cited by examiner (A)

(B)

101

(A)

(B)

(C)

(A)

(B)

(A)

(B)

(C)

(D)

(E)

(F)

REFLECTED LIGHT

PATHS (PROJECTIONS) OF
SUNLIGHT AND REFLECTED LIGHT
ARE SAME IN
BOTH CELESTIAL SPHERES

SOLAR HEAT COLLECTING APPARATUS AND SOLAR HEAT COLLECTING METHOD

TECHNICAL FIELD

The present invention relates to a solar heat collecting apparatus and solar heat collecting method using reflection mirrors that reflect sunlight toward a receiver to collect heat.

BACKGROUND ART

Energy has traditionally been produced from petroleum and other fossil fuels, but in recent years, concerns have emerged regarding the depletion of fossil fuels, emissions of greenhouse gases such as carbon dioxide from the use of fossil fuels, and rising fuel costs.

Sunlight, which is renewable and involves no fuel costs, has been gathering attention as a new energy source.

There are a number of different solar heat collecting apparatuses that use sunlight as their energy source, which can be differentiated by the system of sunlight collection (See Patent Literature 1). Among these, for example, are the parabolic trough type and the linear Fresnel type heat collectors, as well as the tower type heat collector.

The parabolic trough heat type collector consists of a trough-shaped parabolic mirror used to reflect sunlight and collect it in the receiver to collect solar heat.

The linear Fresnel type heat collector consists of plural reflecting mirrors installed on plural parallel reflection lines laid out in the north-south direction, and a receiver installed over the mirrors in a north-south oriented reception line to collect sunlight reflected from the mirrors and thereby collect solar heat.

The tower type heat collector uses a heliostat mechanism to adjust an angle of a reflecting surface of plural reflecting mirrors installed around a tower to collect sunlight and thereby collect solar heat in the receiver on the tower.

CITATION LIST

Patent Literature

Patent Literature 1: Japanese Unexamined Patent Publication (Kokai) No. 2012-63086

SUMMARY OF THE INVENTION

Technical Problem

Thus, a variety of sunlight collection systems are used in solar heat collectors, but it cannot be said that systems such as the parabolic trough type and linear Fresnel type collect sufficient heat from the energy source, that is, sunlight, and there is a need for a solar heat collecting apparatus that can collect heat more efficiently.

With the tower type system, a heliostat mechanism is used, as shown for example in FIG. 27. A T-shaped support ("T-bone") is attached to the back of each reflecting mirror, and it is possible to rotate the reflecting mirrors at an appropriate angle to follow the movement of the sun by rotating each part of the T-bone as shown in FIG. 27. However, the movement of the T-bone is complicated, and it is difficult to control the angle of the reflecting surface with precision.

Bearing these problems in mind, the present invention aims to provide a solar heat collecting apparatus and solar heat collecting method that make it possible to simply collect solar heat with a high degree of precision and efficiency.

Solution to Problem

In order to achieve the goal described above, the present invention provides a solar heat collecting apparatus comprised of plural reflection lines and one or more reception lines, wherein the plural reflection lines are arranged in parallel in a north-south direction; each reflection line is provided with plural reflecting mirrors that reflect sunlight; the plural reflecting mirrors are provided with a heliostat mechanism that causes the plural reflecting mirrors to follow a movement of the sun to adjust an angle of a reflecting surface of the plural reflecting mirrors;

the heliostat mechanism includes an east-west angle adjustment unit, having a rotating ring, to adjust the angle of the reflecting surface of the plural reflecting mirrors in the east-west direction, and a north-south angle adjustment unit, having actuators, to adjust the angle of the reflecting surface of the plural reflecting mirrors in the north-south direction;

the rotating ring is connected to the plural reflecting mirrors via a frame, and the angle of the reflecting surface of the plural reflecting mirrors on each reflection line is simultaneously adjusted via the frame by a rotation of the rotating ring;

the actuators are disposed to correspond one-to-one to the plural reflecting mirrors, each reflecting mirror is connected to an arm of the corresponding actuator, and the angle of the reflecting surface of each reflecting mirror is individually adjusted by a back-and-forth motion of the arm of the corresponding actuator; and, the one or more reception lines are arranged in a fixed position above and orthogonal to the plural reflection lines, each reception line is provided with one receiver, and the receiver collects heat from the reflected light of the sunlight reflected by the plural reflecting mirrors.

This sort of apparatus, with reflection lines and reception lines arranged as described above, is a cross linear type solar heat collecting apparatus, and it makes it possible to collect solar heat more efficiently and at lower cost than, for example, conventional linear Fresnel type collectors.

Furthermore, the apparatus includes a rotating ring and actuators as described above, separating the controls that adjust the angle of the reflecting surface of the reflecting mirrors in the east-west direction from those that adjust the angle of the reflecting surface of the reflecting mirrors in the north-south direction. In conventional systems, the angle of the reflecting surface is adjusted to an appropriate angle using only the T-bone, which makes control complicated. However, by separating the east-west and north-south angle adjustment controls as the present invention does, control is simplified, and precision is greatly increased. In other words, it is possible to adjust the angle of the reflecting surface simply, at low cost, and with high precision. Accordingly, it is easy to reflect sunlight toward the receiver at the proper angle, making it possible to improve heat collection efficiency.

It is possible that the east-west angle adjustment unit has a plurality of the rotating rings, with each rotating ring fitted with a roller, and a rotation drive of the roller of at least one of the plurality of the rotating rings is motor-controlled.

Using the rollers and motor, this sort of apparatus makes it possible to simultaneously adjust the angle of the reflecting surface of the plural reflecting mirrors on one reflection line simply and accurately.

Also, it is possible that the arm of the corresponding actuator is attached to the back side of each reflecting mirror, and supports each reflecting mirror.

Because the back side of the reflecting mirror is supported by the arm, it is harder for the reflecting mirror to shake when the wind blows. Therefore, even when it is windy, reflected sunlight is appropriately focused on the receiver. This makes it possible to inhibit the loss of heat collection efficiency due to wind.

It is possible that the rotation of the rotating ring and the back-and-forth motion of the arm of each actuator are controlled on the basis of internal angle adjustment data of each reflecting mirror, relative to a movement of the sun according to the calendar and true solar time.

The appropriate angle for the reflecting surface was conventionally sequentially calculated based on the actual position of the sun, and the T-bone was controlled to adjust the angle of the reflecting surface on the basis of the calculation. By using the internal angle adjustment data as the basis for controls, the system is simplified, with no need to sequentially calculate using the position of the sun. With no need for sequential calculation, it is possible to adjust the angle of the reflecting surface without falling behind the movement of the sun, and with high precision and low cost.

It is possible for the rotation of the rotating ring and the back-and-forth motion of the arm of each actuator to be centrally controlled.

This makes it possible to uniformly control the rotating rings and the actuators. This is convenient, for example, when adjusting the initial reflecting surface angle when starting to collect reflected light and heat, and during maintenance.

With reference to the east-west angle adjustment unit, it is possible for the angle of the reflecting surface of each of the plural reflecting mirrors to be individually adjusted in the east-west direction, and with reference to the north-south angle adjustment unit, it is possible for the angle of the reflecting surface of each of the plural reflecting mirrors to be individually adjusted in the north-south direction.

As noted above, there are several different types of solar collector, but it cannot be said that these conventional systems have collected sufficient heat from the energy source, that is, sunlight, and there is a need for a solar heat collecting apparatus that can collect heat more efficiently.

More specifically, with the tower type systems and the other sunlight collection systems noted above, it is difficult to collect light to the receiver efficiently, due to significant aberration depending on the time (for example, 9:00 a.m., or any time other than 10:00 a.m. to 2:00 p.m., etc.), and image blurring and distortion. Accordingly, it is not possible to steadily collect light to the receiver throughout the day. As shown in FIG. 26, the light is intense around the center (the center of the concentrated image), but in other areas the light fans out weakly for collection. In the areas outside the center where the light is weaker, it is difficult to use the collected light in the areas and heat energy thereof effectively, and it becomes, in effect, a loss.

However, with the present invention, that is, a cross linear type solar heat collecting apparatus with the heliostat and the reflection lines and the reception lines arranged as described above, it is possible to reduce light collection aberration throughout the day, at any time of day. Image blurring and distortion are also inhibited, so that compared with conventional systems in which the collected light is intense only around the center, the collected light is intense over a wider area, as shown in FIG. 25, and more uniform light collection is possible. There is no fanning out, as seen in conventional systems, and high degree of light collection are seen in other areas besides the center, preventing energy loss and making it possible to efficiently and steadily collect light and heat thereof throughout the day.

Further, as noted above, the invention has an east-west angle adjustment unit and a north-south angle adjustment unit, with separate controls for adjusting the angle of the reflecting surface of the reflecting mirrors in the east-west and north-south directions. Controlling east-west and north-south adjustment separately simplifies the controls, and greatly increases accuracy. In other words, it is possible to adjust the angle of the reflecting surface simply, at low cost, and with great accuracy. This makes it easier to reflect sunlight to the receiver at the appropriate angle, and makes it possible to improve heat collection efficiency.

Because it is also possible for the angle of the reflecting surface of each of the plural reflecting mirrors to be individually adjusted in both the east-west and north-south directions, when trying to reflect sunlight more accurately toward the receiver, slight angle adjustments can be made to account for the installation location of each reflecting mirror. This makes it possible to collect sunlight and heat thereof with even greater precision.

Sufficient sunlight can be collected and heat collection efficiency is high as noted, making it possible to reduce the scale of the receiver and the reflecting mirror installation as needed. This makes it possible to reduce the size of both the solar heat collecting apparatus and the land required for its installation, reducing costs and making installation possible even in countries where open spaces for the installation of the solar heat collecting apparatus are not readily available.

It is possible that the east-west angle adjustment unit further has fine-tuning units, the fine-tuning units are disposed to correspond one-to-one to the plural reflecting mirrors, and the angle of the reflecting surface of each of the plural reflecting mirrors that has been simultaneously adjusted by the rotation of the rotating ring is individually further fine-tuned according to a position of each reflecting mirror by the corresponding fine-tuning unit.

The angle of the reflecting surface was conventionally adjusted to an appropriate angle using only the T-bone, making control complicated, but the rotating ring, the fine-tuning units, and the actuators make it possible to adjust the angle of the reflecting surface more simply and with greater precision.

Furthermore, the east-west angle adjustment unit has the rotating ring for the simultaneous adjustment of the angle of the reflecting surface of the plural reflecting mirrors, and the fine-tuning units for additional individual adjustment. Such a present invention prevents the fine-tuning units from being large in size for purpose of individual adjustment, and it is easy to adjust the angles with high precision.

Further, it is possible that the plural reflecting mirrors on each reflection line are supported and connected by a connecting element, and in the north-south direction, the connecting element is positioned on a slant, with one end relatively higher than the other end, such that the closer to the one end each of the plural reflecting mirrors that are supported by the connecting element is installed, the higher each reflecting mirror is positioned.

Because the connecting element is positioned as described above and the reflecting mirror that is closer to the one end is relatively higher than the one that is closer to the other end in the north-south direction, it prevents the sunlight reflected from the reflecting mirror that is closer to the one end from being blocked by the reflecting mirror that is closer to the other end and not reaching the receiver (prevention of blocking). This makes it possible to collect solar heat with greater efficiency.

Further, compared with conventional apparatus such as trough type, for example, it is possible to position the reflecting surface of the reflecting mirrors in a way that is nearly orthogonal to the rays of the sun. This makes it possible to improve reflection efficiency and to collect solar heat efficiently.

It is possible that the connecting element is positioned on a slant with the north end relatively higher than the south end, such that the closer to the north each of the plural reflecting mirrors that are supported by the connecting element is installed, the higher each reflecting mirror is positioned, or, the connecting element is positioned on a slant with the south end relatively higher than the north end, such that the closer to the south each of the plural reflecting mirrors that are supported by the connecting element is installed, the higher each reflecting mirror is positioned.

In this way, when the reflecting sunlight from the south in the northern hemisphere, blocking can be prevented more certainly if the reflecting mirror that is closer to the north is positioned relatively higher than the one that is closer to the south.

Also, when reflecting the sunlight from the north in the southern hemisphere, blocking can be prevented more certainly if the reflecting mirror that is closer to the south is positioned relatively higher than the one that are closer to the north.

It is also possible the plural reflecting mirrors are positioned at equal distances from each other.

Conventionally, even with cross linear type systems, it was necessary to widen the spaces between reflecting mirrors positioned closer to the north, to prevent blocking. Thus, the spaces between reflecting mirrors were not uniform. The present invention prevents blocking by positioning the reflecting mirrors that are closer to the north higher than those that are closer to the south, allowing the reflecting mirrors to be evenly spaced. This simplifies the manufacture and installation of the solar heat collecting apparatus described by the present invention.

It is also possible to rotate the connecting element in the north-south direction, and to adjust the slant angle in the north-south direction.

This makes it possible to adjust a relative vertical position of the reflecting mirrors to prevent blocking and increase heat collection efficiency, in response to a degree of latitude at which the solar heat collecting apparatus is installed, and the height of the sun relative to changes in the calendar.

It is possible that the solar heat collecting apparatus further comprises an imaging device to record each of the plural reflecting mirrors and capture an actual image of each reflecting mirror;

an arithmetic processing device to simulate, from a sun's actual position, an ideal image of each reflecting mirror when the reflecting surface has been adjusted to an ideal angle for reflecting sunlight into the receiver;

an image processing device to compare the actual image and the ideal image of each reflecting mirror and obtain image displacement; and a central control device that controls the imaging device, the arithmetic processing device, the image processing device and the heliostat mechanism, wherein the heliostat mechanism, based on the image displacement, is controlled by the central control device to adjust the angle of the reflecting surface of each reflecting mirror to the ideal angle, and contains the internal angle adjustment data of each reflecting mirror, relative to a movement of the sun according to the calendar and true solar time, and based on the internal angle adjustment data, adjusts the angle of the reflecting surface of each reflecting mirror that has been adjusted to the ideal angle.

As noted above, the movement of the T-bone is complicated, and it is difficult to control the angle of the reflecting surface in that way with high accuracy.

When collecting heat, the ideal angle of the reflecting surface of the reflecting mirror is calculated based on the position of the sun, and the T-bone adjusts the angle on the basis of these calculations. To properly adjust angles in this way, the T-bone on which the reflecting mirror is installed must be precisely positioned in a spot on the ground that has been very accurately surveyed, and must stand in a precisely vertical position. The installation of the reflecting mirrors was therefore a laborious process.

Unlike the conventional systems that required accurate surveying for the installation of the T-bone, the present invention makes it possible to install the reflecting mirrors simply and at low cost, and also makes it possible to adjust reflecting surfaces to their ideal angle when beginning heat collection. The imaging device makes it possible to confirm the actual state of the reflecting surfaces.

Further, adjustments are based on the internal angle adjustment data, which is simple and eliminates the need for sequential calculations, as required by conventional methods. Because sequential calculations are not needed, it is possible to adjust the angle of the reflecting surface accurately and at low cost, without falling behind the movement of the sun.

This, therefore, makes efficient solar heat collection possible.

It is also possible that the imaging device is a CCD camera.

This makes it possible to obtain the actual images of sufficient image quality for use in adjusting the reflecting surfaces of the reflecting mirrors to their ideal angles.

It is possible that the central control device controls the imaging device, the arithmetic processing device, the image processing device, and the heliostat mechanism wirelessly.

By having the above various devices communicate with each other wirelessly, it is possible to reduce costs. It is also possible to adapt to enlargement in the size of the solar heat collecting apparatus easily.

The present invention provide a solar heat collecting method which includes arranging plural reflection lines in parallel in a north-south direction, each reflection line being provided with plural reflecting mirrors that reflect sunlight, and adjusting an angle of a reflecting surface of the plural reflecting mirrors by a heliostat mechanism to follow the movement of the sun; and arranging one or more reception lines in a fixed position above and orthogonal to the plural reflection lines, each reception line being provided with one receiver, and collecting heat from reflected light of the sunlight reflected by the plural reflecting mirrors, the solar heat collecting method comprising:

when adjusting the angle of the reflecting surface of the plural reflecting mirrors in the east-west direction by an east-west angle adjustment unit, having a rotating ring, of the heliostat mechanism, connecting the rotating ring to the plural reflecting mirrors via a frame and simultaneously adjusting the angle of the reflecting surface of the plural reflecting mirrors on each reflection line via the frame by a rotation of the rotating ring; and when adjusting the angle of the reflecting surface of the plural reflecting mirrors in the north-south direction by a north-south angle adjustment unit, having actuators, of the heliostat mechanism, making the actuators are disposed to correspond one-to-one to the plural reflecting mirrors, connecting each reflecting mirror to an arm of the corresponding actuator, and individually adjusting the angle of the reflecting surface of each reflecting mirror by a back-and-forth motion of the arm of the corresponding actuator, and thereby reflecting sunlight and collecting heat.

With this method, the reflection lines and the reception lines are positioned for cross linear type solar heat collection system, which, compared to conventional methods such as the linear Fresnel type system, makes low-cost, high-efficiency solar heat collection possible.

Further, having the rotating ring and the actuators, the control mechanism that adjusts the angle of the reflecting surface of the reflecting mirrors is divided into a mechanism to adjust the angle in the east-west direction, and a mechanism to adjust the angle in the north-south direction. Conventionally, the angle of the reflecting surface was adjusted to an appropriate angle using only the T-bone, making control complicated. However, the present invention divide a control of the mechanism into a control in the east-west direction and a control in the north-south direction, therefore, the mechanism is controlled more simply and with greater precision. In short, it is possible to adjust the angle of the reflecting surface simply and at low cost, and with great precision. Thus it is easier to reflect sunlight toward the receiver, making it possible to improve heat collection efficiency.

Also, with reference to the east-west angle adjustment unit, it is possible for the angle of the reflecting surface of each of the plural reflecting mirrors to be individually adjusted in the east-west direction, and with reference to the north-south angle adjustment unit, it is possible for the angle of the reflecting surface of each of the plural reflecting mirrors to be individually adjusted in the north-south direction.

Because it is possible to individually adjust the angle of the reflecting surface of each of the plural reflecting mirrors in the east-west direction and in the north-south direction, when reflecting sunlight toward the receiver with greater accuracy, slight angle adjustments depending on the location of each reflecting mirror are also possible. This results in greater precision in collecting sunlight and collecting heat thereof.

Because sufficient sunlight can be collected, heat collection efficiency is high, making it possible to reduce the scale of the receiver and the reflecting mirror installation. This makes it possible to reduce the size of both the solar heat collecting apparatus and the land required for its installation, reducing costs and making installation possible even in countries where open spaces for the installation of the solar heat collecting apparatus are not readily available.

Also, it is possible that the east-west angle adjustment unit further has fine-tuning units and the fine-tuning units are disposed to correct one-to-one to the plural reflecting mirrors, and the angle of the reflecting surface of each of the plural reflecting mirrors that has been simultaneously adjusted by the rotation of the rotating ring is individually further fine-tuned according to a position of each reflecting mirror by the corresponding fine-tuning unit.

Conventionally, the angle of the reflecting surfaces was adjusted to an appropriate angle using only the T-bone, making control complicated, but the rotating ring, the fine-tuning units, and the actuators make it possible to adjust the angle of the reflecting surface more simply and with greater precision.

Furthermore, the east-west angle adjustment mechanism has rotating rings for the simultaneous adjustment of the angle of the reflecting surface of the plural reflecting mirrors, and fine-tuning units for additional individual adjustment. Because individual adjustment is possible, the fine-tuning units does not need to be large in size, and it is easy to adjust angles with high precision.

Further, it is possible that when reflecting sunlight and collecting heat, the plural reflecting mirrors on each reflection line are supported and connected by a connecting element, and in the north-south direction, the connecting element is positioned on a slant, with one end relatively higher than the other end, such that the closer to the one end each of the plural reflecting mirrors that are supported by the connecting element is installed, the higher each reflecting mirror is positioned.

With this method such as cross linear type system, which, compared to conventional methods such as the trough type system, makes low-cost, high-efficiency solar heat collection possible.

Further, the use of the connecting element as described above makes it possible to prevent blocking, improving reflection efficiency and heat collection efficiency.

Also, it is possible that the connecting element is positioned on a slant with the north end relatively higher than the south end, such that the closer to the north end each of the plural reflecting mirrors that are supported by the connecting element is installed, the higher each reflecting mirror is positioned, or, the connecting element is positioned on a slant with the south end relatively higher than the north end, such that the closer to the south end each of the plural reflecting mirrors that are supported by the connecting element is installed, the higher each reflecting mirror is positioned.

In this way, when reflecting the sunlight from the south in the northern hemisphere, blocking can be prevented more effectively if the reflecting mirror that is closer to the north is positioned relatively higher than the one that is closer to the south.

Also, when reflecting the sunlight from the north in the southern hemisphere, blocking can be prevented more effectively if the reflecting mirror that is closer to the south is positioned relatively higher than the one that is closer to the north.

It is possible that the solar heat collecting method comprises an alignment process for the angle of the reflecting surface of the plural reflecting mirrors and a heat collection process for the reflected light after the alignment process, wherein the alignment process comprises:

a step in which the plural reflecting mirrors are each recorded by an imaging device and an actual image of each reflecting mirror is captured;

a step in which the ideal image of each reflecting mirror when the reflecting surface has been adjusted to the ideal angle for reflecting sunlight into the receiver is simulated from the sun's actual position in an arithmetic processing device;

a step in which the actual image and the ideal image of each reflecting mirror are compared with an image processing device to obtain image displacement; and a step in which, based on the image displacement, the angle of the reflecting surface of each reflecting mirror is adjusted by the heliostat mechanism to the ideal angle, and wherein in the heat collection process, the angle of the reflecting surface of each reflecting mirror that has been adjusted to the ideal angle in the alignment process is adjusted by the heliostat mechanism based on angle adjustment data of each reflecting mirror, relative to a movement of the sun according to the calendar and true solar time, to reflect sunlight and collect heat.

As noted above, in conventional systems, the adjustment of reflecting surface angles was a laborious process, as the positioning of the reflecting mirrors themselves required a high level of precision.

However with the present invention, the positioning of the reflecting mirrors does not require such a high degree of precision, making them easier to install. This is because during the alignment process prior to actually collecting heat from sunlight, the imaging device, the arithmetic processing device, the image processing device and the heliostat mechanism are used to adjust the angle of the reflecting surface of the reflecting mirrors, for example, to the ideal angle at the start of the heat collection process. This makes it possible to reduce the cost and effort involved in the installation of the reflecting mirrors, i.e., the construction of the solar heat collecting apparatus.

Further, it is possible to simply adjust the reflecting surfaces to the ideal angle based on the image displacement, and possible to make adjustments while confirming the actual state of the reflecting surfaces using the imaging device.

Conventionally, the appropriate angle for the reflecting surface was sequentially calculated based on the actual position of the sun, and the T-bone was controlled to adjust the angle of the reflecting surface on the basis of the calculation.

However, by using angle adjustment data as the basis for adjustment as the present invention does, the system is simplified, with no need to sequentially calculate using the position of the sun. With no need for sequential calculation, it is possible to adjust the angle of the reflecting surface without falling behind the movement of the sun, with high precision and low cost.

Therefore, it is possible to efficiently collect solar heat.

Advantageous Effects of Invention

The present invention, a cross linear-type apparatus with control mechanisms that are simpler than those of conventional systems, makes it possible to adjust the reflecting surface of the reflecting mirrors easily and with great accuracy, thereby making it possible to collect heat at low cost and with high efficiency.

The present invention, a cross linear-type apparatus, makes it possible to prevent blocking, thereby making it possible to collect heat at low cost and with high efficiency.

Further, the present invention makes it possible to install reflecting mirrors more easily and at lower cost than conventional systems. Moreover, it is possible to adjust reflecting surfaces to the ideal angle when starting to collect solar heat, and to adjust angles along with the movement of the sun while collecting heat, simply, and with high precision and low cost. In this way it becomes possible to collect heat with high efficiency.

BRIEF DESCRIPTION OF DRAWINGS

FIG. 3(A) is a top view of the rotating rings and the frame. FIG. 3(B) is a side view of the rotating rings and the frame. FIG. 3(C) is an explanatory diagram of an example of the fine-tuning unit. FIG. 3(D) is an explanatory diagram of another example of the fine-tuning unit. FIG. 3(E) is an explanatory diagram of another example of the fine-tuning unit.

FIG. 4(A) is a diagram viewing from the arrow direction of A of FIG. 2. FIG. 4(B) is a diagram viewing from the arrow direction of B of FIG. 2.

FIG. 13(A) shows that the angle formed by the top wall and the side wall on the south side is equivalent to the angle formed by the top wall and the side wall on the north side. FIG. 13(B) shows that the angle formed by the top wall and the side wall on the south side is smaller than the angle formed by the top wall and the side wall on the north side.

FIG. 14(A) shows that the reception line and the long box are centered over the rows of the plural reflecting mirrors. FIG. 14(B) shows that the long box is situated to the south of the plural reflecting mirrors. FIG. 14(C) shows that the long box is situated to the south of the plural reflecting mirrors in another configuration.

FIG. 18(A) shows that the tube with surface treatment. FIG. 18(B) shows that the tube with coating.

BRIEF DESCRIPTION OF DRAWINGS

The following is an explanation of an embodiment of the present invention, but the present invention is not limited to this embodiment.

As described above, large aberrations are seen in conventional light collection systems, making the collection of solar heat from collected sunlight inefficient in some ways. The present inventor discovered that by using the cross linear type light collection system, it is possible to reduce aberration and efficiently collect sunlight.

The invention was completed by the discovery that splitting the control mechanism for adjusting the angle of the reflecting surface of the reflecting mirrors into a mechanism for angle adjustment in the east-west direction and a mechanism for angle adjustment in the north-south direction, it is possible to collect heat simply and with great precision and efficiency.

In general, the cost of a solar heat collecting apparatus includes the cost of the large plot of land on which it must be installed. To minimize the land area needed for installation and reduce associated costs, it is necessary to further increase light collection efficiency. The inventor undertook diligent research into ways of increasing light collection efficiency in cross linear type light collection systems, and focused on the question of reflecting mirror angle adjustment.

Figure 22:
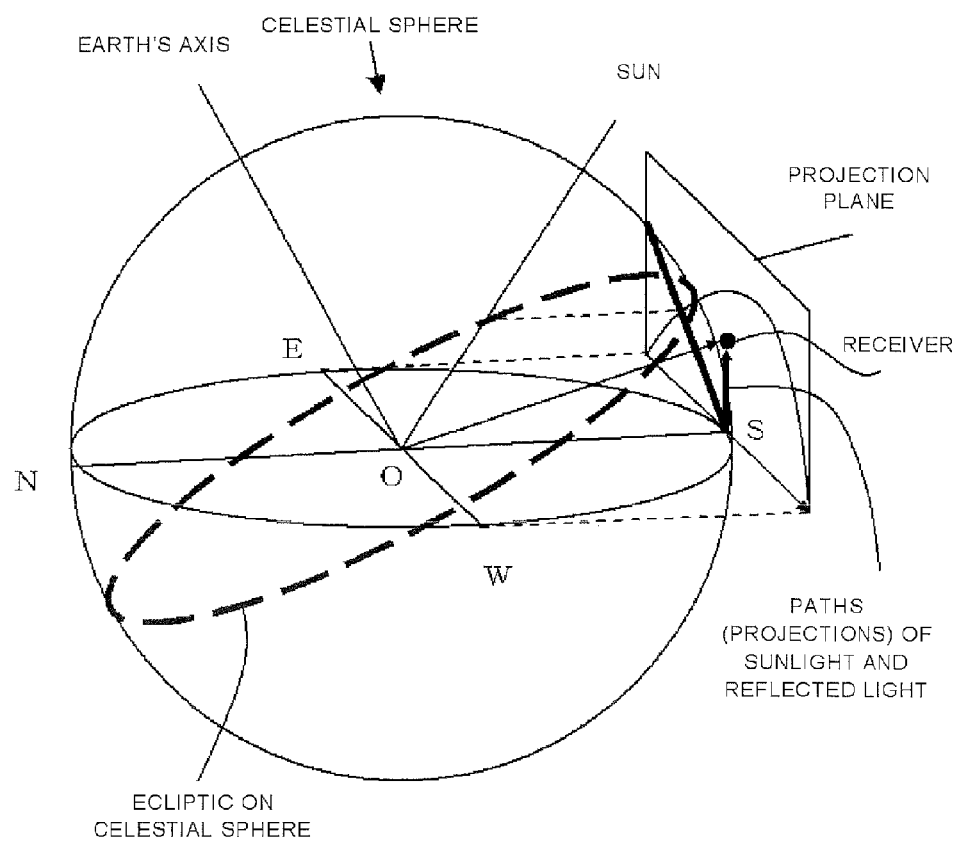
FIG. 22 is an explanatory diagram showing an example of the positional relationship of the sun, the receiver and the reflecting mirror relating to the principles of cross linear type light collection system.

A brief explanation of the principles of cross linear light type collection follows. FIG. 22 shows an example of the positional relationship of the sun on the vernal equinox, the receiver, and the reflecting mirror. At the center O of the celestial sphere is positioned one reflecting mirror, which reflects sunlight toward the receiver. On the projection plane, the sunlight enters the reflecting mirror on the celestial sphere, and reflected light from the reflecting mirror moves toward the receiver along the projected pathway.

Figure 23:
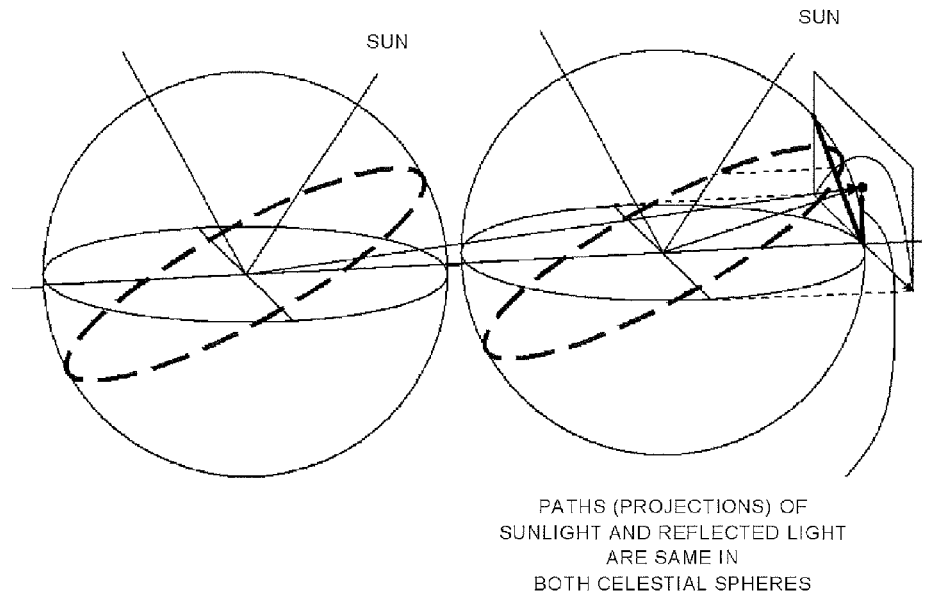
FIG. 23 is an explanatory diagram showing another example of the positional relationship of the sun, receiver and reflecting mirrors relating to the principles of cross linear type light collection system.

In a cross linear type system, plural reflecting mirrors such as these are positioned in the north-south direction. This arrangement is illustrated in FIG. 23. FIG. 23 shows two reflecting mirrors. As shown here, for each mirror, the sunlight enters from the same direction on each celestial sphere, so that the path of the light on the projected plane forms the same pattern for either mirror. However, the angle of the reflecting surface of the reflecting mirror is smaller for the mirror that is positioned further from the receiver.

Figure 24:
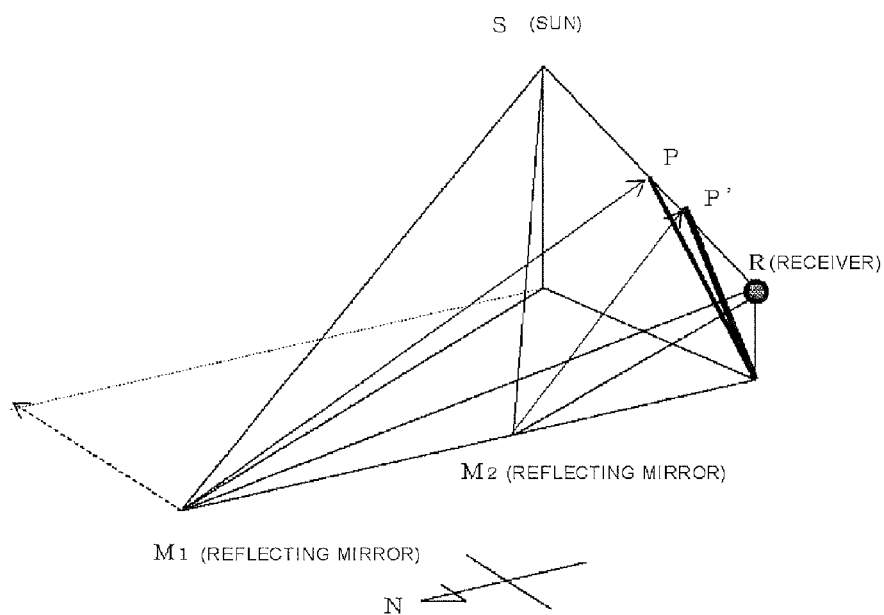
FIG. 24 is an explanatory diagram showing another example of the positional relationship of the sun, receiver and reflecting mirrors relating to the principles of cross linear type light collection system.

Strictly speaking, however, as depicted in FIG. 24, the angle needed to reflect sunlight from the reflecting surface to the receiver (north-south and east-west) is slightly different depending on the position of the reflecting mirror. Specifically, in order to reflect sunlight to receiver R, the angle of reflecting mirror $M_1$ is adjusted so that the reflecting surface is perpendicular to the straight line, $M_1P$, that bisects $\angle SM_1R$. On the other hand, the reflecting surface of reflecting mirror $M_2$ is adjusted so that it is perpendicular to the straight line, $M_2P'$, that bisects $\angle SM_2R$, and so its angle differs from that of the reflecting surface of reflecting mirror $M_1$.

Accordingly, when the angles of plural reflecting mirrors installed in different positions are all simultaneously adjusted to face the same direction, even if a given reflecting mirror is adjusted to the ideal angle for reflecting sunlight to the receiver, the sunlight to another reflecting mirror is reflected at an angle that is slightly different from the ideal angle of another reflecting mirror.

The present inventor discovered that by making it possible to individually adjust the angle of the reflecting surface in the east-west and north-south directions, it is possible to collect light with greater precision, and further improve heat collection efficiency.

<First Embodiment>

Figure 1:
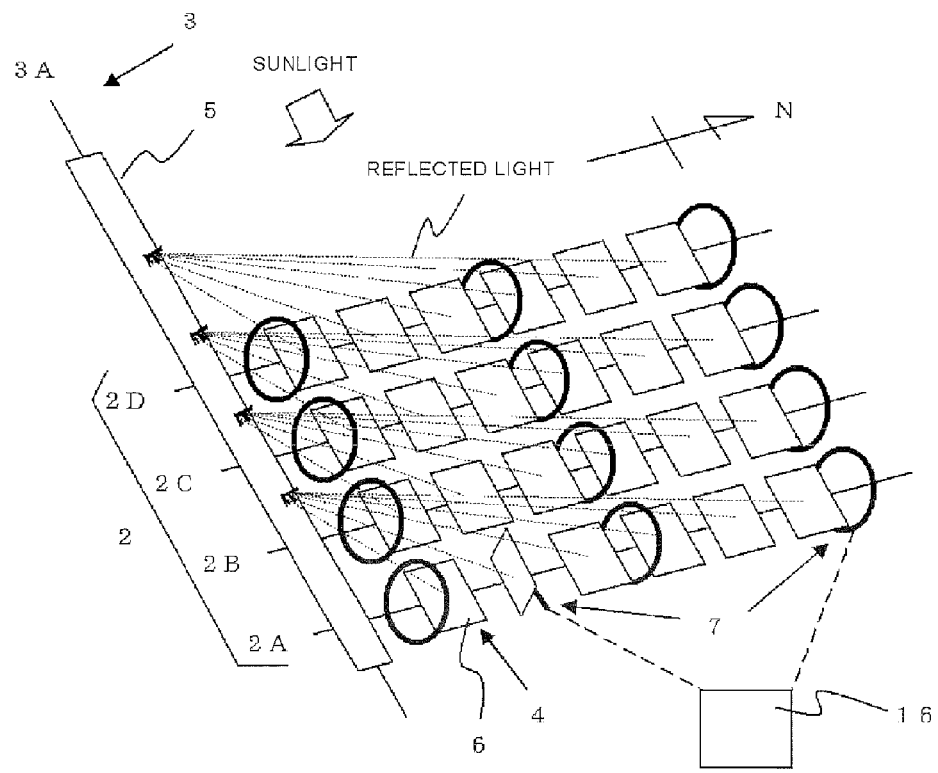
FIG. 1 is a schematic diagram showing an example of the solar heat collecting apparatus of the present invention.

FIG. 1 shows an example of the heat collecting apparatus of the present invention.

The overall structure of the heat collecting apparatus is as follows: plural reflection lines 2 and one or more reception lines 3 are provided. Each reflection line 2 is equipped with plural reflecting mirrors 4, and there is a receiver 5 on the reception line 3. Sunlight irradiates the reflecting mirrors 4 and is reflected, and when the reflected light is collected in receiver 5, solar heat is collected.

A medium within the receiver that is warmed by the collected solar heat is sent to steam or gas turbines (not shown) to generate electricity.

The parts of the apparatus are described as follows:

The plural reflection lines 2 are arranged parallel to each other in the north-south direction. FIG. 1 shows an example in which there are 4 reflection lines, 2A to 2D, but as long as there are plural reflection lines 2, there is no particular requirement as to the number of lines.

The one or more reception lines 3 are arranged in a fixed position over and orthogonal to reflection lines 2, in other words, in the east-west direction.

The example in FIG. 1 shows 1 reception line 3A, but 2 or more lines can be used, as appropriate. For example, if the reflecting mirrors 4 and the receiver 5 in FIG. 1 are considered one unit, a plurality of these units can be arranged in parallel.

Also, there is no particular requirement as to the vertical distance between the reception line 3 and the reflection line 2, so the distance can be adjusted as appropriate depending on conditions to make it easy to collect sunlight.

As is apparent from the relationship between the reflection lines and the reception lines, the heat collecting apparatus 1 is cross linear type, making low-cost, high-efficiency sunlight heat collection possible.

Regarding the plural reflecting mirrors 4, as long as the mirrors have a reflecting surface 6 to reflect sunlight, there are no particular requirements as to their shape, etc. For example, the sunlight reflecting surface 6 could be flat, or it could be concave. There are no particular size requirements either, so, for example, an area of the reflecting surface 6 of about 3 m×1.5 m could be used.

Plural reflecting mirrors 4 are arranged on each of the reflection lines 2A to 2D. FIG. 1 shows an example with 6 mirrors on each line, but there is no particular requirement as to the number of mirrors. For example, the number of mirrors could be decided on the basis of the amount of space available.

Figure 2:
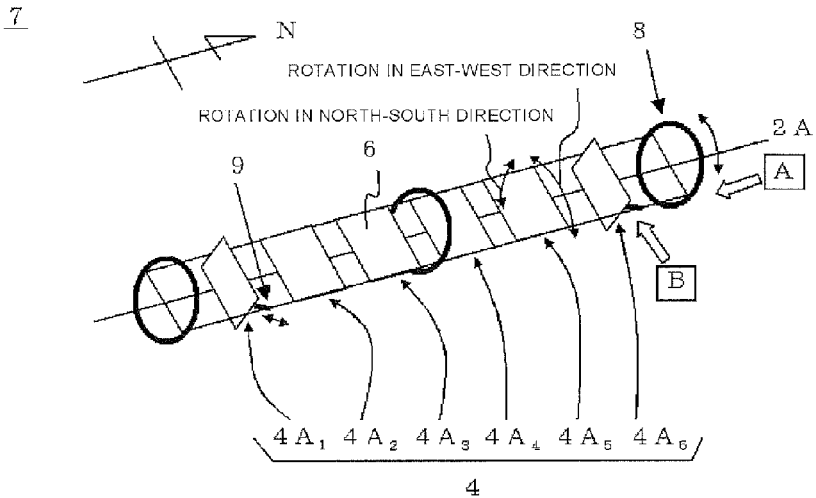
FIG. 2 is a schematic diagram showing an example of the heliostat mechanism.

The reflecting mirrors 4 are equipped with a heliostat mechanism 7. FIG. 2 shows an example of the heliostat mechanism 7.

The heliostat mechanism adjusts an angle of the reflecting surface 6 in accordance with a movement of the sun. There are units of adjusting the angle of the reflecting surface 6 of the reflecting mirror 4 in the east-west direction (east-west angle adjustment unit 8), and in the north-south direction (north-south angle adjustment unit 9). The diagram shows reflection line 2A with reflecting mirrors $4A_1$ to $4A_6$ as an example, but reflection lines 2B to 2D would also have these angle adjustment unit.

Figure 27:
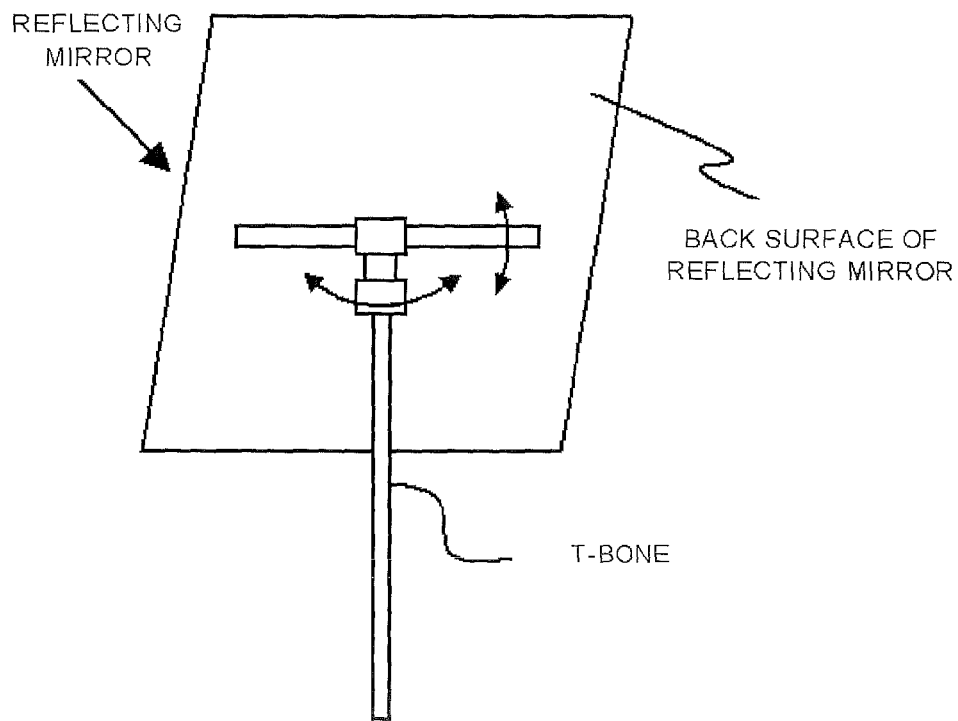
FIG. 27 is an explanatory diagram showing an example of a conventional T-bone heliostat mechanism.

In conventional systems, the T-bone alone would be used to adjust a reflecting surface angle to an appropriate angle, as depicted in FIG. 27, but with the present invention's heliostat mechanism 7, the units of adjusting east-west and north-south angles are different. These units of adjustment operate separately from one another to adjust angles in each direction. Accordingly, controls are simple, and it is possible to adjust angles with great precision.

(East-west Angle Adjustment Unit)
(Rotating Ring)

Figure 3:
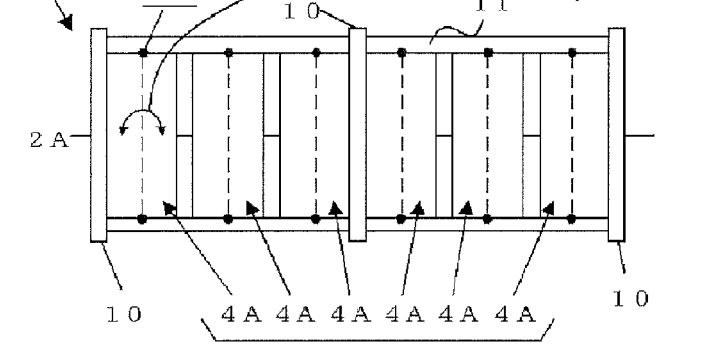
FIG. 3 are schematic diagrams showing examples of the east-west angle adjustment unit.
Figure 3:
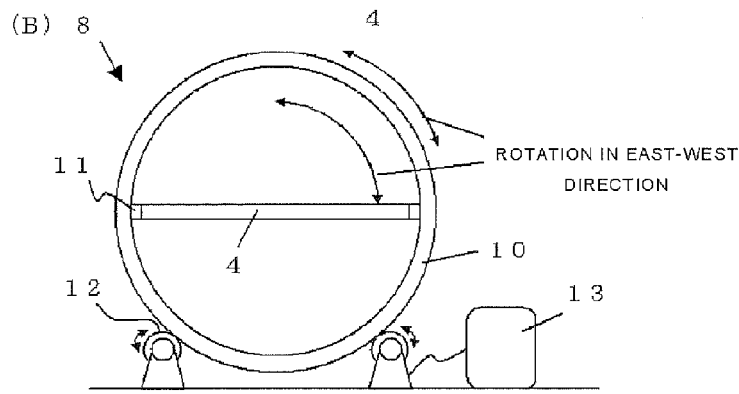
Figure 3:
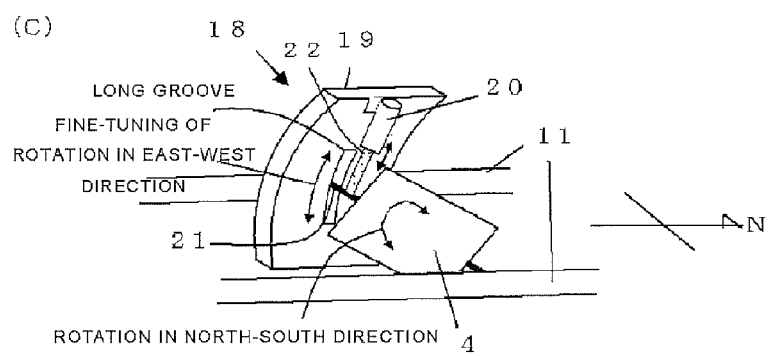
Figure 3:
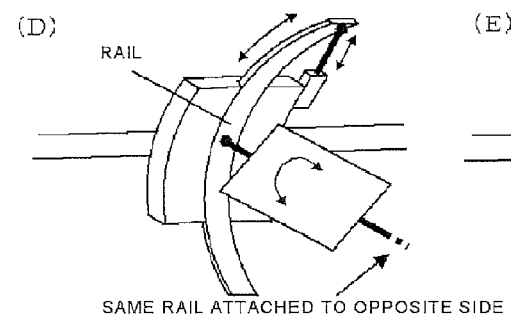
Figure 3:
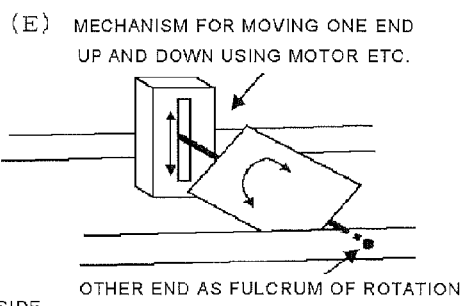

First, the east-west angle adjustment unit 8 is described. FIG. 3 shows an example of the east-west angle adjustment unit 8. FIG. 3(A) shows a top view of the east-west angle adjustment unit 8, and FIG. 3(B) shows a side view. The reflecting mirrors $4A_1$ to $4A_6$ on the reflecting line 2 are also shown.

As shown in FIG. 3(A), the east-west angle adjustment unit 8 is equipped with rotating rings 10 and a frame 11.

As shown in FIGS. 2 and 3(A), the frame 11 encloses all of the reflecting mirrors $4A_1$ to $4A_6$ that are positioned in series in the north-south direction, connecting the east and west sides of each reflecting mirror $4A_1$ to $4A_6$. Further, the center of the side of each reflecting mirror $4A_1$ to $4A_6$ is connected with the frame 11, enabling each reflecting mirror $4A_1$ to $4A_6$ to rotate in the north-south direction centered on the axis of the connected parts (the dotted line in FIG. 3(A)).

As shown in FIG. 3(A), the rotating rings 10, for example, encloses the frame 11 from the outside, situated at and attached to the center and both ends of the frame 11. Specifically, the rotating rings 10 and the reflecting mirrors $4A_1$ to $4A_6$ are connected via the frame 11.

This example shows three rotating rings 10, but there is no particular requirement as to the number of rings as long as there is one or more. For example, there could be just one ring in the center of frame 11, but plural rings are preferred, and it is possible to have more rings than are shown in FIG. 3.

As long as the reflecting mirrors $4A_1$ to $4A_6$ are adequately held and can be simultaneously rotated, the size and shape of the frame 11, and the number and size of the rotating rings 10 can be determined as appropriate. Materials could be selected with the weight, etc., of the reflecting mirrors in mind, so that the frame, etc., does not bend.

As shown in FIG. 3(B), each rotating ring 10 is equipped with rollers 12 to rotate the rotating ring 10 in the east-west direction. The means of rotating the rotating ring 10 is not limited to rollers, but with rollers 12 such as these, it is possible to easily rotate the rotating ring 10, and simultaneously rotate the reflecting mirrors $4A_1$ to $4A_6$ that are connected via the frame 11 in the east-west direction.

Here, each rotating ring 10 is equipped with two rollers 12. The rotating rings 10 are supported from underneath by the rollers 12 to enable rotation. There are no specific requirements as to the number and size of the rollers 12, and they could be selected as appropriate.

On at least one of the rotating rings 10, the rollers 12 are connected to a motor 13. The motor 13 controls the rotation drive of the rollers 12, so that the rollers 12 can be rotated at the desired time, and at the desired rotation speed. This makes it possible to control the rotation of the rotating rings 10 with precision in the range of mR to some dozen mR.

The number of the motor 13 can be selected as deemed appropriate.

There is no specific requirement as to degree of rotation (rotation range), as long as the motor 13 and rollers 12 are sufficient to rotate the reflecting mirrors 4 90° per 12 hours so that the reflecting mirrors 4 can reflect sunlight to the receiver 5 in the daytime.

Each reflection line is equipped with this sort of east-west angle adjustment unit 8. This makes it possible for all of the plural reflecting mirrors on a single reflection line to be simultaneously rotated in the east-west direction, and have their angles simultaneously adjusted. It is also possible to adjust the angle of the reflecting mirrors on each of plural reflection lines independently of the other lines.

(Fine-tuning Unit)

The east-west angle adjustment unit is further equipped with fine-tuning units. Each of the plural rotating mirrors that is simultaneously adjusted by the rotating rings 10 is equipped with each fine-tuning unit. The angle of the reflecting surface of each reflecting mirror is additionally adjusted in the east-west direction according to the position of the reflecting mirror by the fine-tuning unit. As long as it can fine-tune the angle of the reflecting surface of each reflecting mirror 4, there is no particular requirement as to the configuration of the fine-tuning unit.

FIG. 3(C) shows an example of a fine-tuning unit 18.

Here, as shown in FIG. 3(C), the fine-tuning unit is comprised of a rotational component 19, a rotational actuator 20, and a rotational axial rod 21.

The rotational component 19 has a curved surface and is connected to the frame 11 and equipped with the rotational actuator 20. The rotational component 19 has a long groove along its curved surface. One end of the rotational axial rod 21 is fitted into this long groove, and this end of the rotational axial rod 21 can move along the long groove. The other end of the rotational axial rod 21 is connected to the frame 11. However, this is not a particular requirement, and there could be another rotational component at the other end of the rotational axial rod 21, with that end fitted into the long groove of that rotational component.

Further, the rotational axial rod 21 is connected to the reflecting mirror 4 along the dotted line shown in FIG. 3(A), and the reflecting mirrors 4 can rotate in the north-south direction centered on the rotational axial rod 21 as described above. In this way, the reflecting mirror 4 is connected to the frame 11 via the rotational axial rod 21 and the rotational component 19.

An end a rotational arm 22 of the rotational actuator 20 is connected to the rotational axial rod 21. A back-and-forth motion of the rotational actuator 20 causes the rotational axial rod 21 to move along the long groove. This makes it possible for the rotational axial rod 21 to turn with the connected reflecting mirror 4 in the east-west direction.

There is no particular requirement as to the back-and-forth range (stroke range) of the rotational arm 22. As described above, the angles of the plural reflecting mirrors 4 will simultaneously be largely adjusted by the rotating rings 10, so it will be sufficient if the rotational axial rod 21 can move enough to further adjust the slight differences in angle that result from the different positioning of each reflecting mirror. For example, a stroke range that allows about 3° of reflecting surface angle adjustment in the east-west direction could be used.

In the present invention, the east-west angle adjustment unit 8 is further equipped with fine-tuning units 18 as shown in FIG. 3(C), making it possible to additionally fine-tune the angle of each reflecting mirror further using the fine-tuning unit 18 after the angles of the plural reflecting mirrors have been largely adjusted using the rotating rings. Thus, the angle of the reflecting surface can be adjusted in the east-west direction with more precision and more simply than if there were no fine-tuning unit 18. This makes it possible to collect light and heat thereof with greater efficiency.

The configuration of the fine-tuning unit shown in FIG. 3(C) is not a particular requirement, and other configurations could be used. For example, the fine-tuning unit could also consist of rails, that move up and down by means of actuators, etc., attached to both sides of the reflecting mirror, such that the up-and-down movement of each rail causes the rotational axial rod, of the reflecting mirror, attached to each rail to move up and down, fine-tuning the angle of the reflecting surface in the east-west direction as shown in FIG. 3(D).

Also, as shown in FIG. 3(E), it is possible to equip one end of the rotational axial rod of the reflecting mirror with a mechanism for moving that end up and down, such that the up-and-down movement causes the reflecting mirror to rotate for fine-tuning, using the other end of the rotational axial rod as a fulcrum. The other end could be connected to the frame in an appropriate manner to allow it to function as a fulcrum.

The east-west angle adjustment unit 8 is not limited to the configurations shown in FIG. 3 (rotating rings and fine-tuning units), and it is possible to use just one means of angle adjustment to individually adjust the angle of the reflecting surface of each reflecting mirror 4 in the east-west direction. However, when just one means of adjustment is used to make fine adjustments of the angle of each reflecting mirror in the east-west direction, the means of adjustment can become large, and its controls can become complicated. By using a combination of the rotating rings 10 (for general angle adjustment) and fine-tuning units 18 (for fine angle adjustment) as described above, it is possible to avoid wasteful complication and increased equipment sizes. It is also possible to adjust angles with a high degree of precision.

(North-south Angle Adjustment Unit)

Figure 4:
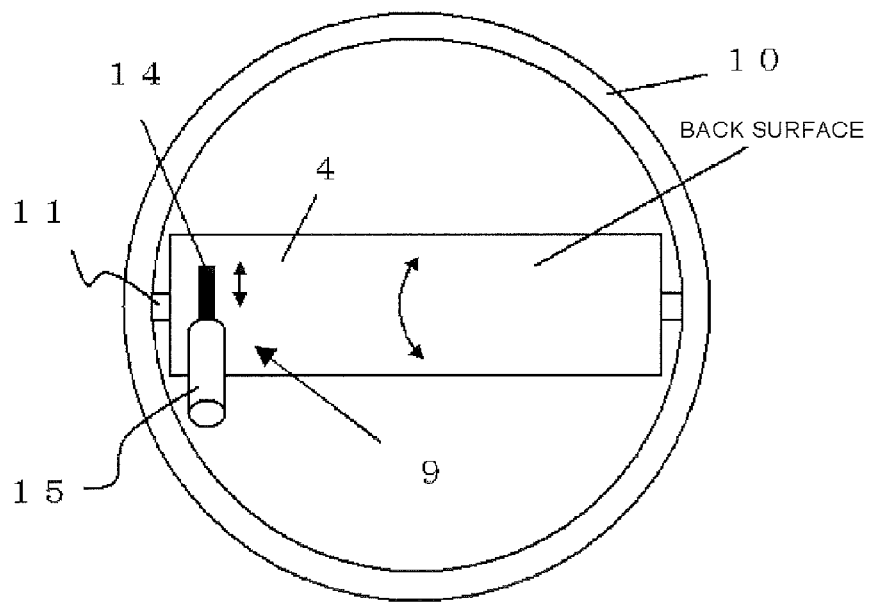
FIG. 4 are schematic diagrams showing examples of the north-south angle adjustment unit.
Figure 4:
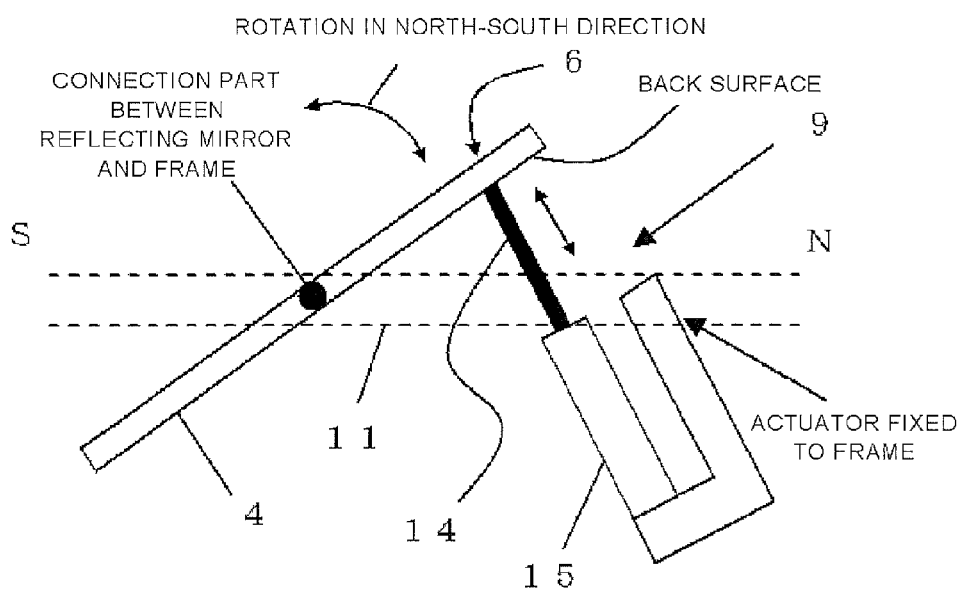

The north-south angle adjustment unit is described as follows. An example of the north-south angle adjustment unit 9 is shown in FIG. 4. FIG. 4(A) shows a diagram viewing from the arrow direction of A of FIG. 2, with the rotating ring 10, the frame 11, and the reflecting mirror 4 identified to clarify the positional relationship of the components. FIG. 4(B) shows a diagram viewing from the arrow direction of B of FIG. 2, with the frame 11 and the reflecting mirror 4 identified.

The north-south angle adjustment unit 9 is fitted individually on each reflecting mirror 4, and is equipped with an actuator 15 that has an arm 14. The actuator 15 causes the arm 14 to move back and forth. The arm 14 is connected to the reflecting mirror 4.

The end of the arm 14 is connected to the back surface of the reflecting mirror 4, where its back-and-forth motion can push and pull the back surface of the reflecting mirror 4 to rotate it in the north-south direction centered on the axis formed by the connecting parts of the reflecting mirror 4 and the frame 11. The angle of the reflecting surface 6 of the reflecting mirror 4 can be adjusted in the north-south direction according to the distance of the back-and-forth motion of the arm 14.

There is no particular requirement as to the back-and-forth range (stroke range) of the arm 14, as long as sunlight can be adequately reflected toward the receiver throughout the year. Due to the tilt of the earth's axis, the height of the sun varies within a range of (23.4°×2) over the course of a year. The stroke range of the arm 14 may be determined so that it is possible to at least adjust the angle of the reflecting surface 6 within that range.

The arm 14 pushes and pulls the back surface of reflecting mirror 4 to rotate the reflecting mirror 4 as described above, but at the same time, it supports the reflecting mirror 4 from the back.

As shown in FIG. 27, the conventional T-bone system rotates each part to adjust the reflecting mirror to a appropriate angle to conform to the movement of the sun. With this T-bone system, the reflecting mirror could shake in the wind, having an adverse effect on reflection to the receiver. However, the support provided by the arm 14 of FIG. 4 effectively prevents the reflecting mirrors 4 from shaking if the wind blows. Thus, it is possible to prevent reflection to the receiver in an inappropriate manner due to shaking the reflecting mirror 4, and curb the loss of heat collection efficiency.

The configuration described here, with the arm 14 connected to the back surface of reflecting mirror 4, is not a particular requirement, and the manner in which the arm 14 and the reflecting mirror 4 are connected can be determined as appropriate. For example, the arm 14 could be connected to the side of the reflecting mirror 4.

Also, it is not absolutely necessary for the reflecting mirror 4 and the arm 14 to be connected. Any structure that supports the reflecting mirror appropriately while allowing it to rotate is acceptable.

As described above, the reflecting mirror 4 is rotated in the east-west direction on their frame 11, so it is preferable for the actuator 15 to be fixed on the frame 11. By fixing the actuator 15 on the frame 11, the actuator's 15 arm 14 will be able to adjust the angle of the reflecting surface 6 in the north-south direction after the frame 11 and the reflecting mirror 4 have been rotated to adjust the angle of the reflecting surface 6 in the east-west direction by the rotating ring 10, just as it did prior to the east-west rotation.

Each reflecting mirror is equipped with this sort of corresponding north-south angle adjustment unit. This makes it possible to separately rotate reflecting mirrors 4 in the north-south direction, and adjust the angle of the reflecting surfaces 6 in the north-south direction. It is also possible to adjust the angle of each reflecting mirror individually.

The mechanism for adjusting the angle of the reflecting surface 6 by rotating the reflecting mirrors 4 with the east-west angle adjustment unit 8 and north-south angle adjustment unit 9 has been described above.

With the T-bone system shown in FIG. 27, the angle of the reflecting surface must be adjusted to the desired position using only the T-bone, making control complicated.

However, with the present invention, the angle adjustment of the reflecting surface is shared by the east-west angle adjustment unit including the rotating ring and the fine-tuning units, and the north-south angle adjustment unit including actuators. This means that the east-west angle adjustment unit need only adjust the angle in the east-west direction, and the north-south angle adjustment unit need only adjust the angle in the north-south direction, making it possible to adjust the angle of the reflecting surface easily with a simple control mechanism, and this combination makes it possible to adjust the angle of the reflecting surface to the desired angle with a high degree of precision. Each of these mechanisms is simple and therefore low in cost.

It is not enough to simply adjust the angle of the reflecting surface 6 to the desired angle, rather, the heliostat mechanism 7 must adjust the angle to follow the movement of the sun.

To perform this sort of angle adjustment smoothly, the east-west angle adjustment unit 8 and the north-south angle adjustment unit 9 may have internal angle adjustment data of reflecting mirrors 4, relative to the movement of the sun according to the calendar and true solar time. As noted above, with respect to the east-west angle adjustment unit 8, the rotation drive of the roller 12 is controlled by motor 13, and the rotating rings 10 and rotational actuator of the fine-tuning unit 18 are also controlled to adjust the angle of the reflecting surface 6 of the reflecting mirror 4 in the east-west direction. It is also possible to forecast the movement of the sun from the calendar and true solar time.

Here it is provided that the motor 13 is equipped with a computer for its drive control, and that patterns for the degree of rotation of the rotating ring 10 and control values of the motor 13 (angle adjustment data) are inputted into the computer to allow the angle of the reflecting surface 6 of reflecting mirrors 4 to be appropriately adjusted to follow the movement of the sun. With regard to the control of the back-and-forth motion of the rotational arm 22, control patterns are similarly inputted into a memory of the rotational actuator 20, or a connected computer. When actually reflecting sunlight to the receiver 5, the motor 13 will operate according to the angle adjustment data in the computer, controlling the rotation of the rotating rings 10 or the back-and-forth motion of the rotational arm 22 of the rotational actuator 20, making it possible to easily adjust the angle of the reflecting surface 6.

Extremely stable control is especially possible for the east-west angle adjustment unit 8, where rotating rings can be made to rotate at a fixed speed, and the fine-tuning unit can be used for additional adjustment as the sun moves from east to west. With the conventional T-bone system, large reflecting mirror rotations are sometimes needed to keep up with the position of the sun, making abrupt accelerations in rotation speed necessary. With the present invention, it is possible to reduce the need for such sudden rotations.

Rather than provide a separate computer, it is also possible, for example, to input angle adjustment data into the internal memory and control circuits of the motor 13, and to control them.

The north-south angle adjustment unit 9 is similarly controlled. Specifically, patterns for control values of the back-and-forth motion of the arm 14 of the actuator 15 (angle adjustment data) are inputted into a memory of the actuator 15 or a related computer to allow the angle of the reflecting surface 6 of reflecting mirrors 4 to be appropriately adjusted to follow the movement of the sun. The back-and-forth motion of the arm 14 of the actuator 15 is controlled in accordance with the angle adjustment data, making it possible to easily adjust the angle of the reflecting surface 6.

Of course, it is also possible, as in conventional systems, to sequentially calculate the position of the sun, calculate the angle of the reflecting surface for that position of the sun, and control the east-west angle adjustment unit 8 and north-south angle adjustment unit 9. However, by using the internal pattern data, conventional sequential becomes unnecessary, and because angle adjustments aren't made after performing the sequential calculations, it is possible to respond more quickly, without falling behind the movement of the sun, and simply and with great precision. It is also possible to increase heat collection efficiency. Decisions can be made as appropriate on the basis of cost, etc.

The east-west angle adjustment unit 8 and the north-south angle adjustment unit 9 can each be independently controlled, but this is not a particular requirement. A central control device 16 as shown in FIG. 1 that connects to the motor 13 and the rotational actuator 20 of the east-west angle adjustment unit 8 and the actuator 15 of the north-south angle adjustment unit 9 may be used, and the central control device 16 may uniformly control the rotation of the rotating rings 10, the back-and-forth motion of the rotational arm 22 of the rotational actuators 20, and the back-and-forth motion of the arm 14 of the actuators 15. For example, the central control device 16 could control the initial angle adjustment of the reflecting surface 6 when starting heat collection or during maintenance. Based on the position of the sun, an appropriate angle for the reflecting surface 6 and motor, etc. control data needed to adjust to the appropriate angle are calculated, and based on these calculations, the initial angle of the reflecting surface 6 is adjusted by the central control device 16.

After adjusting the initial angle, the central control device 16 can continue to adjust angles, or angles can be adjusted using internal data as described above.

The heliostat mechanism 7 could be equipped not only with the east-west angle adjustment unit 8 and the north-south angle adjustment unit 9, but with other means as necessary, as long as it is possible to control the movement of reflecting mirrors 4, and adjust the reflecting surface 6 to the desired angle in the desired angle.

Figure 5:
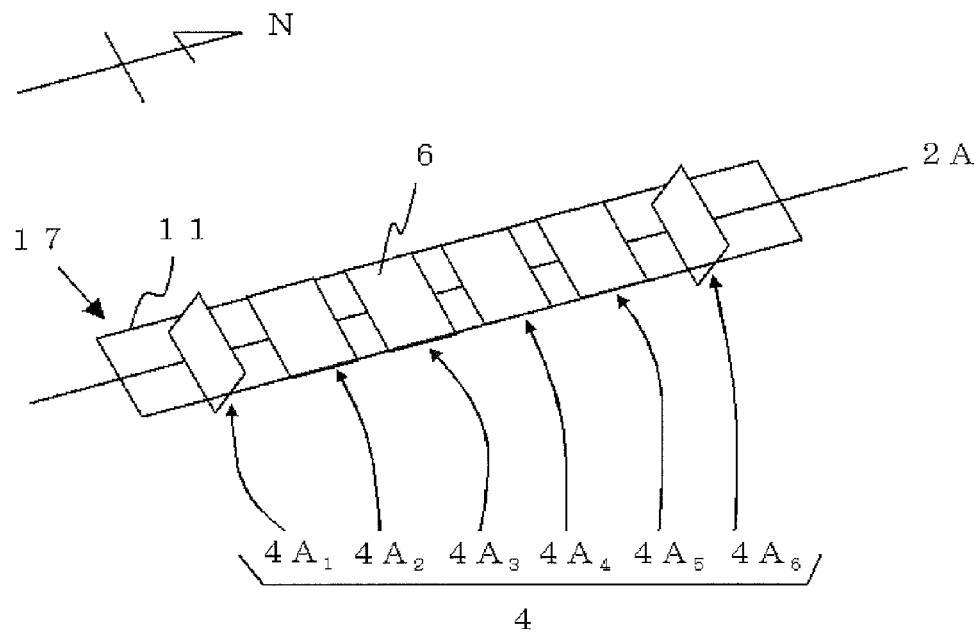
FIG. 5 is an explanatory diagram of the connecting element.
Figure 6:
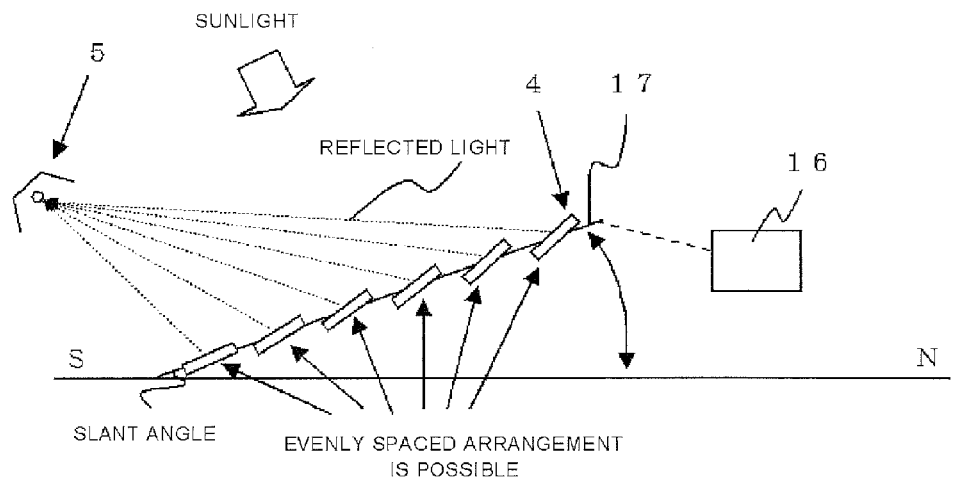
FIG. 6 is an explanatory diagram showing the position of individual reflecting mirrors supported by the connecting element.

In the present invention, a connecting element supports the plural reflecting mirrors 4 in each reflection line. An example of a connecting element is shown in FIG. 5. FIG. 6 shows the positional relationship of the reflecting mirrors that are supported by the connecting element. In FIGS. 5 and 6, the notations for the actuators of the heliostat mechanism and the rotating rings have been omitted. Here, the solar heat collecting apparatus 1 installed in the northern hemisphere will be described.

There is no particular requirement as to the connecting element 17, as long as it supports the plural reflecting mirrors 4 (in FIG. 5, reflecting mirrors $4A_1$ to $4A_6$ on reflection line 2A) on each reflecting line 2. It should be possible to position the connecting element 17 on a slant, such that one end (the north end) is relatively higher than the other end (the south end) (See FIG. 6). There is no particular requirement as to the angle of the slant, which could be, for example, around 15 to 20°. Because of the slant, regarding the positions of the plural reflecting mirrors 4 that are supported by the connecting element 17, a reflecting mirror that is closer to the relatively-higher one end (the north end) is positioned relatively higher than the one that is closer to the relatively-lower other end (the south end).

Here, the frame 11 of the heliostat mechanism 7 also functions as the connecting element 17, but this is not a particular requirement, and it would of course be possible to have an element other than a frame connecting the plural reflecting mirrors 4, and have this serve as the connecting element. The plural reflecting mirrors 4 could be directly or indirectly connected, and by tilting the connecting element, it is possible to adjust the height of all of the plural reflecting mirrors at once.

Here, the connecting element could be positioned at a fixed angle in the north-south direction, or it could be rotatable in the north-south direction such that the north-south angle of the slant can be adjusted as necessary. The members and means necessary for angle adjustment could be used.

In order to efficiently reflect sunlight to the receiver, it is necessary to take the height of the sun into account, but this will of course vary over the course of a day, and depending on the calendar and the latitude of the installation of the apparatus. The heliostat mechanism 7 adjusts the angle of the reflecting surface 6 to account for variation over the course of a day, but to make it easy to account for calendar and latitude variations, it is preferred that the connecting element 17 is possible to adjust the angle of the slant in the north-south direction as described above. The angle of the slant of the connecting element 17 can be adjusted when the sun is low, as it is in the morning. In conventional systems, the position of the reflecting mirrors is adjusted in accordance with the calendar, for example, to the height of the sun at the vernal equinox. However, when it is possible to adjust the north-south angle, it is possible to adjust it more appropriately for the movement of the sun throughout the year, making it possible to collect heat more efficiently.

A connecting element 17 that is positioned on a slant is provided for the following reason:

As shown in FIG. 6, the plural reflecting mirrors 4 are positioned such that the reflecting mirror that is closer to the north end is positioned relatively higher than the one that is closer to the south end, making it easier to prevent blocking. This makes it possible to efficiently collect solar heat.

It is also possible to position the reflecting mirrors 4 so that they are evenly spaced. This simplifies the installation of the plural reflecting mirrors. The connecting element 17 that connects the reflecting mirrors 4 can be provided with connecting portions with the reflecting mirrors 4 at regular intervals, making it easy to manufacture.

Further, it is possible to prevent blocking even when positioning at regular intervals in this way.

Figure 28:
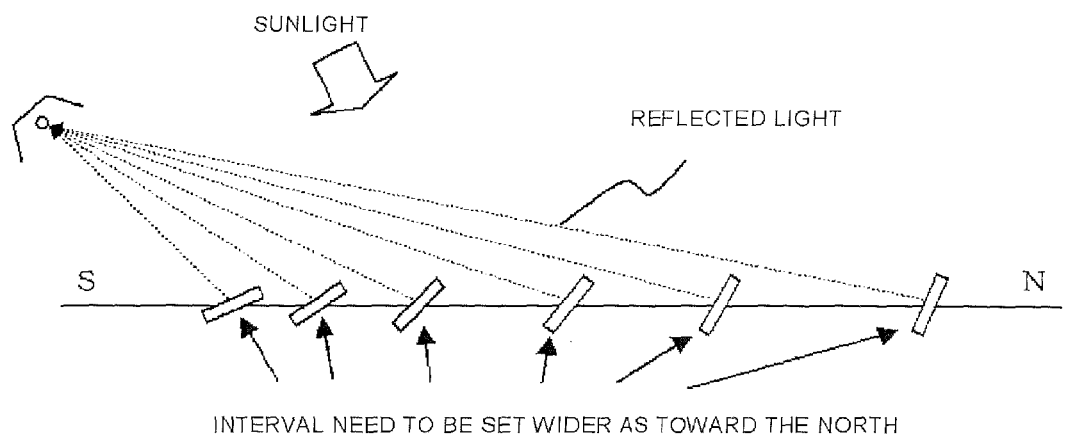
FIG. 28 is an explanatory diagram showing the position of reflecting mirrors in a conventional apparatus.

In order to prevent blocking in a conventional apparatus (see FIG. 28), in which there is no connecting element as there is in the present invention so that plural reflecting mirrors are installed at the same height, it is necessary to gradually increase the space between reflecting mirrors moving toward the north. With this sort of positional relationship, it is not easy to install the reflecting mirrors. This also increases the installation area of the reflecting mirrors, and increases the size of the apparatus, reducing the number of reflecting mirrors per unit area and reducing heat collection efficiency. The present invention resolves these issues.

Compared with a conventional trough type system, for example, it is easier to position the reflecting surface of the reflecting mirror so that it is nearly orthogonal to the sunlight, increasing reflection efficiency and making efficient heat collection possible. In other words, with a trough-shaped parabolic mirror, the north-south angle of the entire mirror is not adjusted, such that sunlight hits the parabolic mirror at a low angle, especially when the height of the sun is low, and heat collection efficiency is poor.

However, because the connecting element 17 of the present invention is tilted, it is possible to have the sunlight hit the reflecting mirror and reflect at a high, nearly orthogonal angle, making improved heat collection efficiency possible.

In a trough type system, if the parabolic mirror is slanted, it becomes necessary to position the receiver on a slant as well, making installation more troublesome than the present invention.

The connecting element 17 could also be connected to the central control device 16, and have its north-south angle adjusted as necessary in accordance with the calendar and latitude, etc., on the basis of various types of internal data stored in a motor, etc. that rotates the connecting element 17 up and down.

When installing the solar heat collecting apparatus in the southern hemisphere, the configuration shown in FIG. 6 could be reversed, with the connecting element tilted so that the south end is relatively higher than the north end.

(Receiver)

The receiver 5 is described as follows.

There are no particular requirements as to receiver 5, and its size and shape can be determined as appropriate. For example, the same type of receiver that is used in conventional systems could be used, as long as it collects reflected sunlight, and can efficiently collect heat.

The receiver 5 has a heat reception tube through which a medium (air or carbon dioxide, etc.) flows, and the medium of the heat reception tube is heated by the solar heat collected in the receiver and transported to a steam turbine, etc. for the production of electricity.

Figure 25:
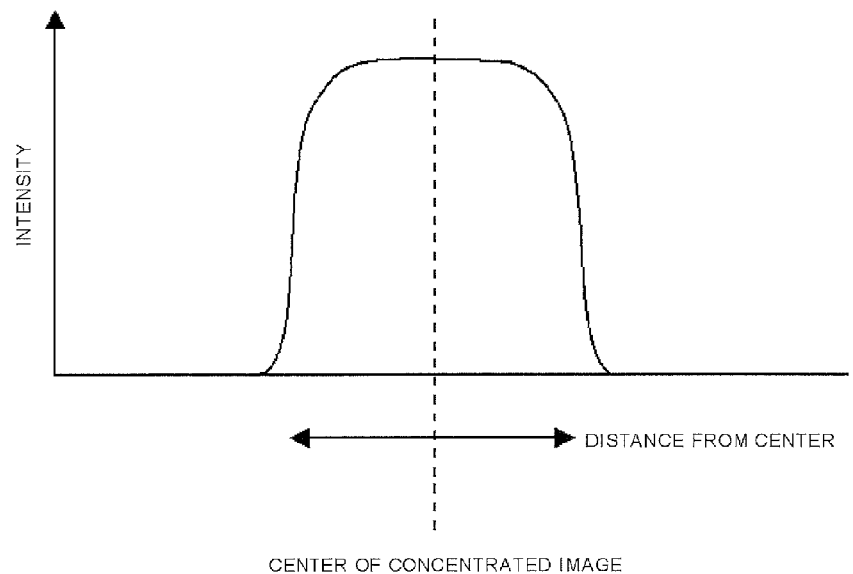
FIG. 25 is a graph showing the intensity distribution of light collected using the light collection system of the present invention.
Figure 26:
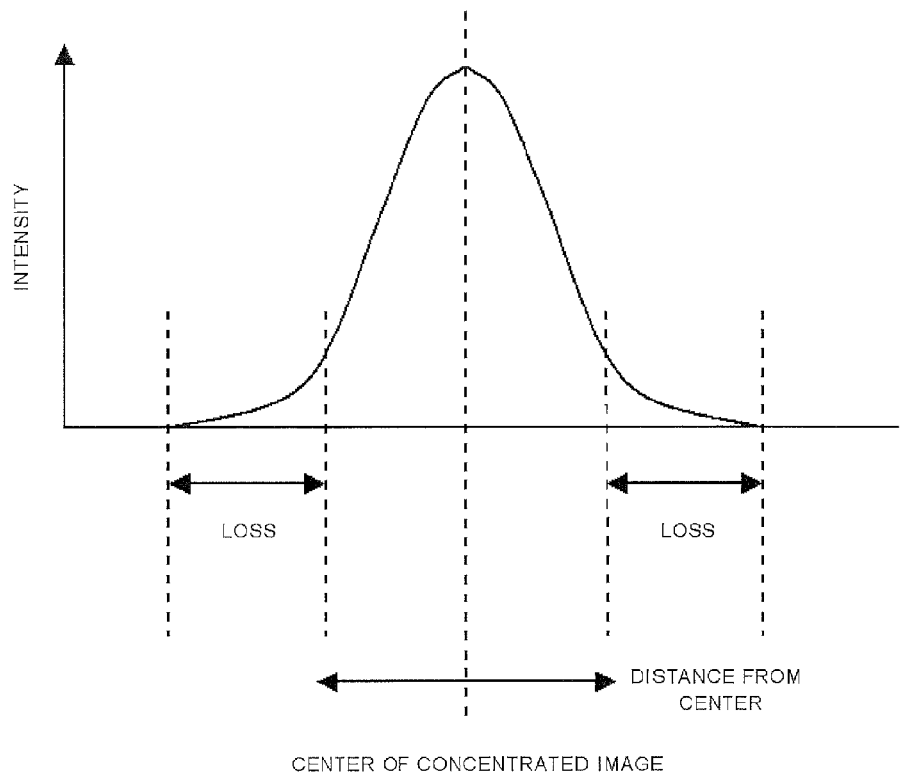
FIG. 26 is a graph showing the intensity distribution of light collected using conventional light collection systems.

As described above, the present invention makes it possible to simply, efficiently, and with great precision adjust the angle of the reflecting mirrors separately in the east-west and north-south directions. Further, because each reflecting mirror can be adjusted individually in the east-west and north-south directions, high-precision adjustment is possible, reducing sunlight collection aberration at any time of the day. As shown in FIG. 25, it is possible to collect strong light uniformly over a broad area. For this reason, light collection is stable throughout the day, and sunlight collection and solar heat collection are extremely efficient.

By increasing the light collection efficiency, it is possible to reduce the size of the receiver and the number of reflecting mirrors, thereby reducing costs. The apparatus can be installed on a smaller land area, making installation and use of the apparatus possible even in areas without extensive land (such as Japan).

The present invention's heat collecting method is described as follows. Here, the embodiment shown in FIG. 1 is used as an example, but the present invention is not limited to that embodiment.

Heat can be collected from the sunlight reflected by the plural reflecting mirrors 4 to the receiver 5 in the following manner:

When the angle of the reflecting surface 6 of the plural reflecting mirrors 4 is adjusted in the east-west direction by the east-west angle adjustment unit 8 incorporating the rotating rings 10 of the heliostat mechanism 7, the rotating rings 10, which are connected to the plural reflecting mirrors 4 via the frame 11, rotate to simultaneously adjust, via the frame 11, the angle of the reflecting surface of all of the plural reflecting mirrors 4 on a single reflection line. When the angle of the reflecting surface 6 of the plural reflecting mirrors 4 is adjusted in the north-south direction by the north-south angle adjustment unit 9 incorporating the actuators 15 of the heliostat mechanism 7, the actuators 15 are disposed to correspond one-to-one to the reflecting mirrors 4, each reflecting mirror is connected to the arm of the corresponding actuator, and the back-and-forth motion of the arm 14 adjusts the angle of the reflecting surface of each reflecting mirror separately, to reflect sunlight and collect heat.

The east-west angle adjustment unit 8 can individually adjust the angle of the reflecting surface 6 of the plural reflecting mirrors 4 in the east-west direction, and the north-south angle adjustment unit 9 can individually adjust the angle of the reflecting surface 6 of the plural reflecting mirrors 4 in the north-south direction.

More specifically, as shown in FIGS. 3(C) to 3(E), the east-west angle adjustment unit 8 is further equipped with fine-tuning units 18, the fine-tuning units 18 are disposed to correspond one-to-one to the plural reflecting mirrors, and the corresponding fine-tuning unit 18 can individually further fine-tune the angle of the reflecting surface 6 of each reflecting mirror 4 according to a position of each reflecting mirror after all of the plural reflecting mirrors 4 have been simultaneously adjusted by the rotation of the rotating rings 10.

It is possible to collect heat in the following manner:

In this example, the heat collecting apparatus is installed and collects heat in the northern hemisphere.

First, the plural reflecting mirrors 4 on each reflection line are connected by the connecting element 17 that also serves as the frame 11. Here the reflecting mirrors 4 are evenly spaced, but this is not a particular requirement, and the reflecting mirrors could be connected at other intervals if necessary.

The connecting element 17 is raised at the north end and rotated in the north-south direction so that it is slanted with the north end relatively higher than the south end. There is no particular requirement as to the angle of the slant in the north-south direction, and it can be set as appropriate. For example, it is possible to adjust on the basis of the season in which heat is collected, on the latitude at which the reflecting mirrors 4 are installed, and on whether it is morning or afternoon, etc. It is possible to account for these conditions, and adjust for each so that the receiver 5 can efficiently collect heat.

The slant could also be set at a fixed angle, or made rotatable in the north-south direction to adjust for the calendar and other conditions. This can be decided on the basis of heat collection efficiency and cost, etc.

Because the angle of the connecting element 17 is adjusted in this way, the plural reflecting mirrors 4 are disposed so that a reflecting mirror that is installed closer to the north end is positioned relatively higher than the one that is installed closer to the south end. The vertical relationship between the reflecting mirrors 4 can easily be adjusted by adjusting the angle of the connecting element 17. This makes it possible to effectively prevent blocking, and improve sunlight reflection efficiency, increasing heat collection efficiency.

Using the heliostat mechanism 7, the rotating rings 10 and actuator 15 adjust the angle of the reflecting surface 6 of the reflecting mirrors 4 to follow the movement of the sun throughout the day as they reflect sunlight to the receiver 5 and collect heat.

When installing the solar heat collecting apparatus in the southern hemisphere, the configuration of the installation in the northern hemisphere shown in FIG. 6 could be reversed, with the connecting element slanted so that the south end is relatively higher than the north end, and heat can be collected.

<Second Embodiment>

Figure 7:
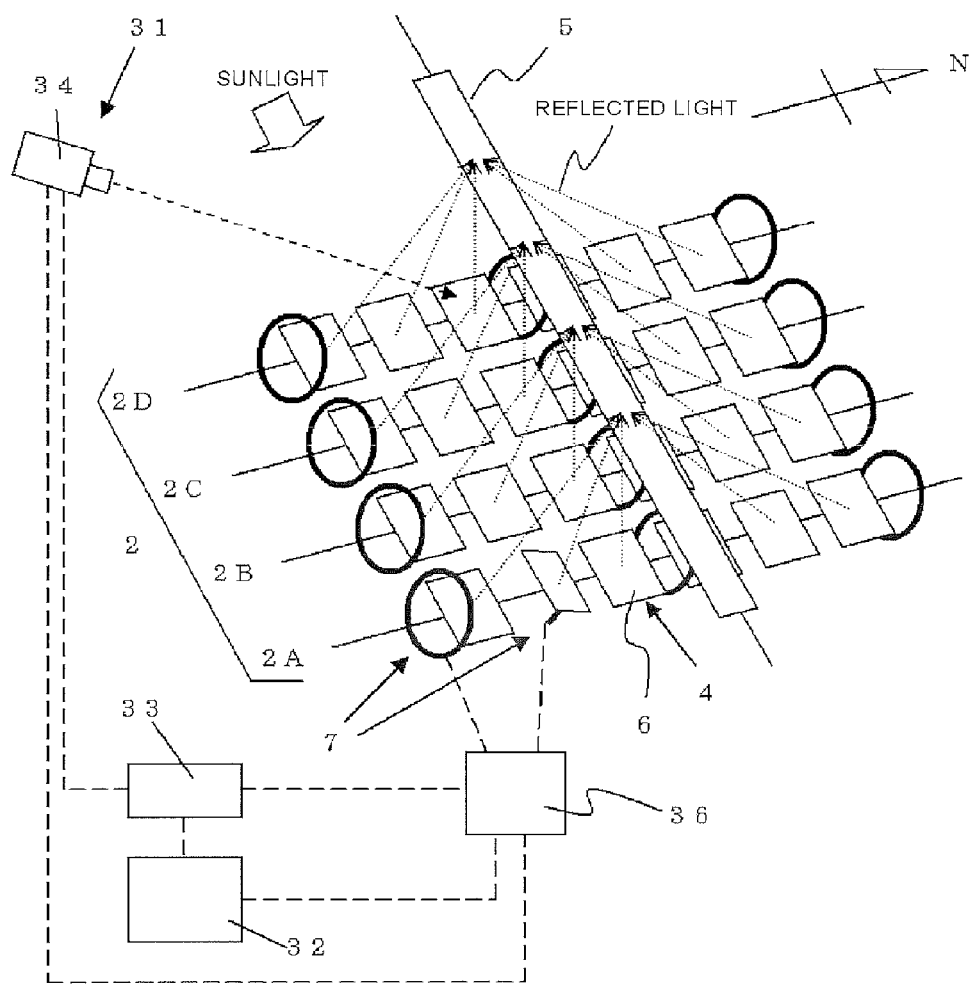
FIG. 7 is a schematic diagram showing another example of the solar heat collecting apparatus of the present invention.

Another example of the solar heat collecting apparatus of the present invention is shown in FIG. 7.

As a whole, a solar heat collecting apparatus 101 is comprised of plural reflecting mirrors 4 equipped with a heliostat mechanism 7, a receiver 5, as well as an imaging device 31, an arithmetic processing device 32, an image processing device 33, and a central control device 36.

The angle of the reflecting surface 6 of the reflecting mirrors 4 is adjusted by the heliostat mechanism 7, the imaging device 31, the arithmetic processing device 32, and the image processing device 33, as controlled by the central control device 36. These devices also adjust the reflecting surface 6 to the ideal angle for reflecting sunlight to the receiver 5 based on the actual position of the sun. After adjusting to the ideal angle, further angle adjustments are made the basis of angle adjustment data for the reflecting mirrors 4, relative to the movement of the sun according to the calendar and true solar time, to collect solar heat in the receiver 5.

For the solar heat collecting apparatus 101 of FIG. 7, the reflecting mirrors, the receiver, the east-west angle adjustment unit and the north-south angle adjustment unit, etc., could be the same as those of the heat collecting apparatus shown in FIG. 1.

Differences between this embodiment and the solar heat collecting apparatus of FIG. 1, are described as follows.

There are no particular requirements as to the imaging device 31, as long as the device can record each of the plural reflecting mirrors 4, and capture an actual image of each reflecting mirror 4 as shown in FIG. 7. For example, a CCD camera 34 could be used. A CCD camera provides sufficient image quality. As long as the device can distinguish between reflecting mirrors 4 and capture an actual image that is sufficient for comparison with the ideal image by the image processing device 33 as described below, it can be selected according to budget, etc.

Further, there are no particular requirements as to the placement and the number of imaging devices 31, and these could be decided according to the size of the solar heat collecting apparatus 101 and the number of reflecting mirrors 4, etc.

Figure 8:
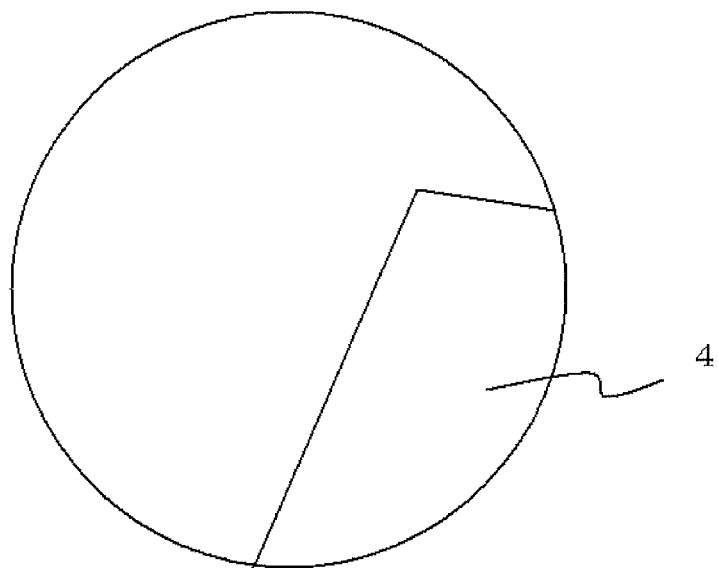
FIG. 8 is an explanatory diagram showing a schematic view of an actual image of the reflecting mirror taken by the imaging device.

FIG. 8 shows a schematic view of the actual image of a reflecting mirror 4 taken by imaging device 31. The shape seen at the right of the shooting area is the reflecting mirror 4. Magnification, etc. is set so that the image can be appropriately compared with the ideal image as described below.

In this example, the device has been set to record the image of a part of the reflecting mirror 4, but this is not a requirement, and the device could be set to record the image of the entire reflecting mirror 4 as well. Recording conditions could be set for efficient comparison.

Next, the arithmetic processing device is described as follows.

The imaging device 31 captures the actual image of the reflecting mirrors 4 as described above, and the arithmetic processing device 32 captures the reflecting mirrors' 4 ideal image. The reflecting mirrors' 4 ideal image is that of a reflecting surface 6 that has been adjusted to the ideal angle to reflect sunlight to the receiver 5, and can be simulated from the actual position of the sun. There are no particular requirements as to the device's program, as long as it can appropriately capture the ideal image described above as viewed from the position of the imaging device 31.

Figure 9:
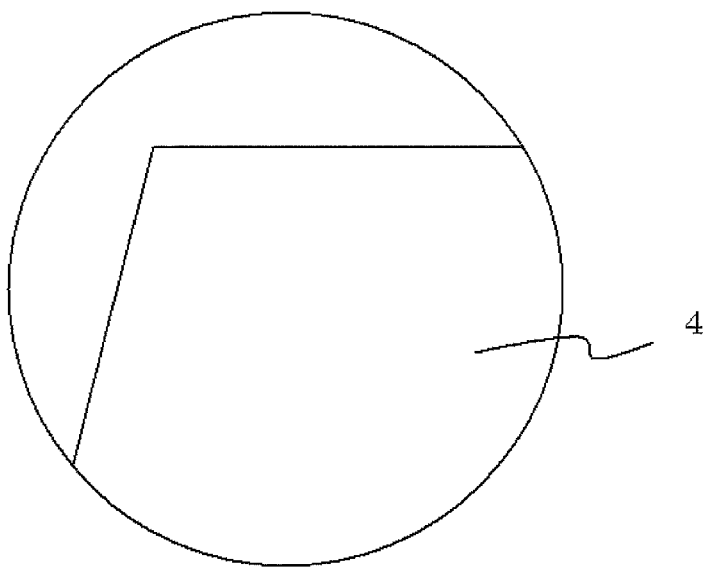
FIG. 9 is an explanatory diagram showing an example of an ideal image for the reflecting mirror as calculated by the arithmetic processing device.

FIG. 9 shows an example of the ideal image of a reflecting mirror 4 created by the arithmetic processing device 32. The ideal is for the reflecting mirror 4 to be centered in the round shooting area.

Next, the image processing device 33 is described as follows.

The image processing device 33 is connected to the imaging device 31 and the arithmetic processing device 32, such that it receives transmission of the actual image of each reflecting mirror 4 taken by the imaging device 31 and the ideal image of each reflecting mirror 4 created by the arithmetic processing device 32. It then compares the two images, for example by overlapping them, to obtain displacement between the images.

There are no particular requirements as to the image processing device's 33 program, as long as it can appropriately obtain the image displacement.

Figure 10:
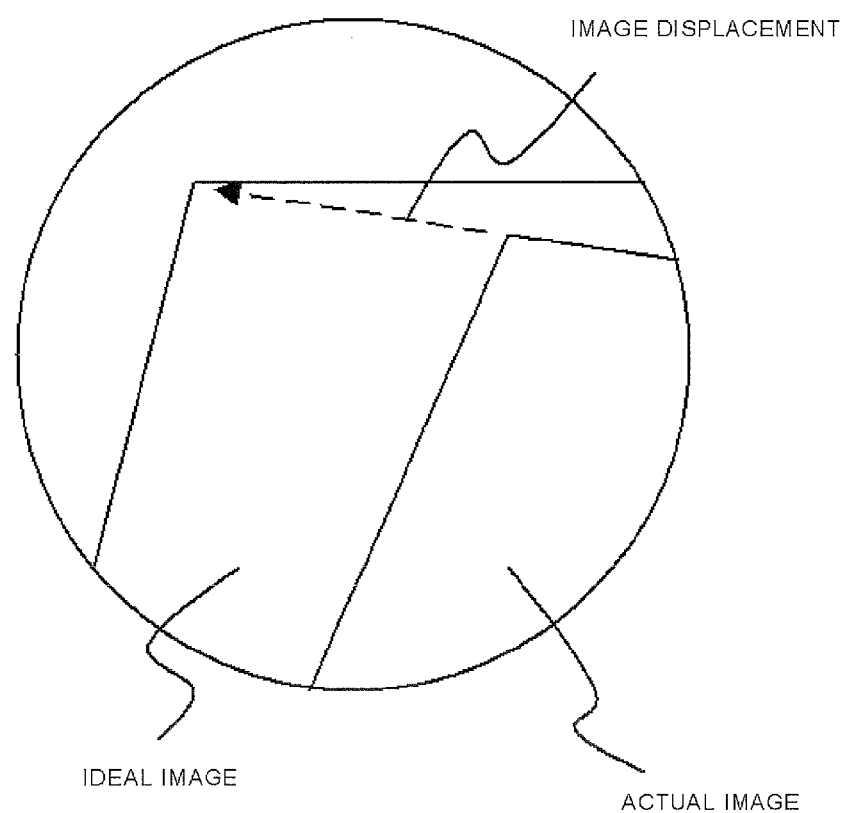
FIG. 10 is an explanatory diagram showing an example of image displacement as derived by the image processing device.

FIG. 10 shows an example of the image displacement obtained by the image processing device 33. Here, the actual image of imaging device 31 and the ideal image of arithmetic processing device 32 are overlapped for comparison. Regarding the position of the reflecting mirror, it can be seen that the actual image is displaced to the right of the ideal image.

Next, the central control device 36 is described as follows.

The central control device 36 is connected to the heliostat mechanism 7, the imaging device 31, the arithmetic processing device 32, and the image processing device 33, and can control each device uniformly.

The central control device 36 can send commands to the imaging device 31, the arithmetic processing device 32, and the image processing device 33 at the desired times to cause those devices to capture the actual image of the reflecting mirrors 4, capture the ideal image of them, and compare the actual and ideal images and obtain the image for displacement, respectively.

The central control device 36 contains a program to compute the control values needed for the components (motor 13, rotational actuator 20, actuator 15) of the east-west angle adjustment unit 8 etc. of the heliostat mechanism 7 to adjust the angle of the reflecting surface 6 of the reflecting mirrors 4 from the actual angle to the ideal angle, based on the image displacement determined by the image processing device 33. The control values computed by the program are sent by the central control device 36 to the heliostat mechanism 7, and the heliostat mechanism 7 is controlled to adjust the angle of the reflecting surface 6 of the reflecting mirrors 4 from the actual angle to the ideal angle.

For example, the heliostat mechanism 7 could be controlled to adjust the angle of the reflecting surface 6 of the reflecting mirrors 4 to the ideal angle so that the image shown in FIG. 10 matches the ideal image (i.e., the image displacement is corrected).

As noted earlier, it is possible to control the east-west angle adjustment unit 8 and the north-south angle adjustment unit 9 of the heliostat mechanism 7 separately, but as described above, it is also possible to adjust the angle of the reflecting surface 6 of the reflecting mirrors 4 by commands from the central control device 36.

In this way, if the apparatus is equipped with the imaging device 31, etc. noted above, it is possible to easily adjust the angle of the reflecting surface 6 of the reflecting mirrors 4 to the ideal angle for the position of the sun. Not only the angle can be adjusted at low cost, but the time required to make the adjustments can be shortened, and the actual status of the reflecting surface 6 can be confirmed by the imaging device 31.

Further, because the angle of the reflecting surface 6 can be adjusted as necessary by using the imaging device 31 etc. following the installation of the heat collecting apparatus 101, there is less cost and effort involved than there would be with a conventional apparatus.

The devices and mechanism described above can be connected to each other by wired communication control, but it is also possible to provide a transmitter and a receiver for wireless communication control. Wireless control is lower in cost than wired control, and it can easily and immediately support the solar heat collecting apparatus 101 when it grows in scale.

Figure 11:
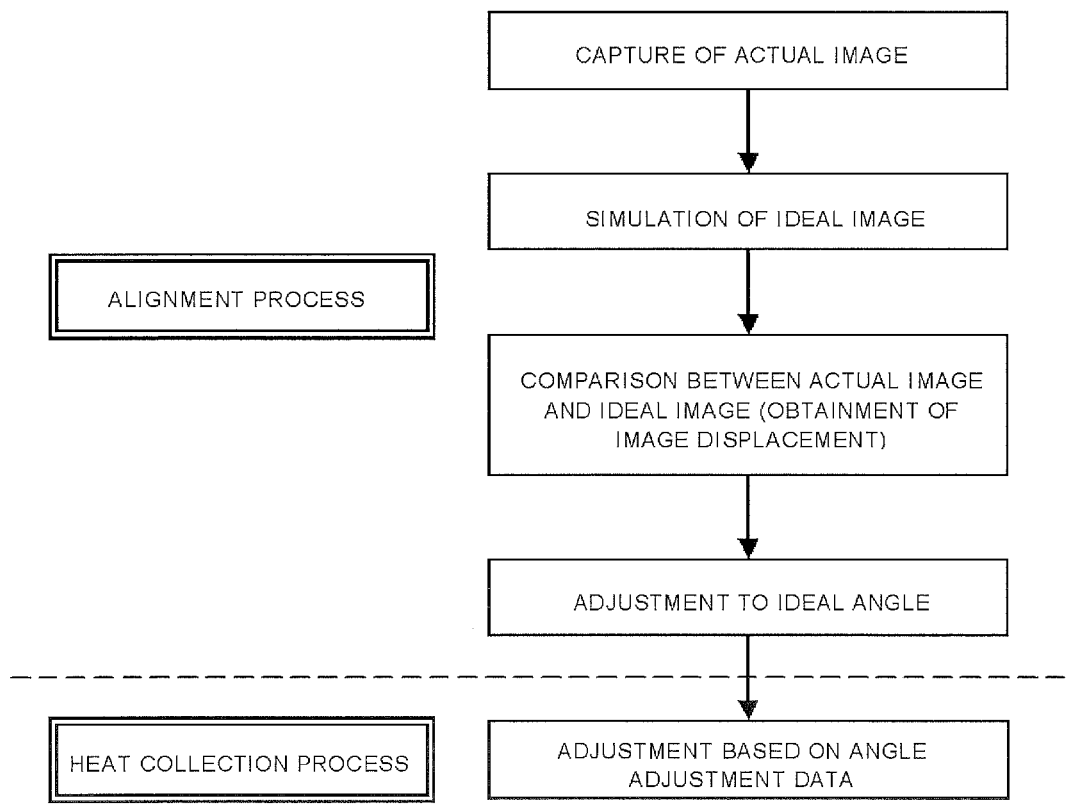
FIG. 11 is a flow chart showing the heat collecting method using the second embodiment.

The method of collecting heat from sunlight using the second embodiment of the present invention, the solar heat collecting apparatus 101 shown in FIG. 7, is described as follows. As shown in the example in FIG. 11, the process can be broadly divided into an alignment process and a heat collection process.

Through the alignment process, the reflecting surface 6 of the reflecting mirrors 4 is adjusted to the ideal angle at the start of the heat collection process, and then heat is collected from sunlight through the heat collection process.

The processes are as follow:
(Alignment Process)

The reflecting surface 6 of the plural reflecting mirrors 4 is aligned (adjusted) to the ideal angle.

More specifically, the central control device 36 sends commands to the imaging device 31, the arithmetic processing device 32, and the image processing device 33.

Each reflecting mirror 4 is recorded by the imaging device 31, such as a CCD camera 34. This captures each actual image (see FIG. 8).

The arithmetic processing device 32 captures the ideal image for each of the reflecting mirrors 4 (see FIG. 9).

The actual image from the imaging device 31 and the ideal image from the arithmetic processing device 32 are sent to the image processing device 33, which compares the two images. This determines image displacement (see FIG. 10).

Next, the image processing device 33 sends the image displacement data to the central control device 36. Then, the central control device 36 computes the control values for the heliostat mechanism 7 based on the image displacement data, so that the reflecting surface 6 of each reflecting mirror 4 will be adjusted from the actual angle to the ideal angle. In other words, the appropriate control values for the motor 13 and the rotational actuator 20 of the east-west angle adjustment unit 8 and the actuator 15 of the north-south angle adjustment unit 9 are computed.

The motor 13, the rotational actuator 20 and actuator 15 are then controlled in accordance with these control values, causing the rotating rings 10 to rotate and the rotational arm 22 and the arm 14 to move forward or backward to adjust the reflecting surface 6 of each reflecting mirror 4 to the ideal angle.

With this sort of method, adjustments of the angle of the reflecting surfaces 6 of the reflecting mirrors 4 to the ideal angle can be made quickly and easily.
(Heat Collection Process)

After adjusting the reflecting surface 6 of each reflecting mirror 4 to the ideal angle through the alignment process described above, sunlight is actually reflected by the reflecting mirrors 4 to the receiver 5 to collect solar heat.

The reflecting surface 6 has been adjusted to the ideal angle for the position of the sun at the start of the heat collection process, but it will become necessary to adjust the angle of reflecting surface 6 to follow the movement of the sun.

The present invention collects solar heat by controlling the heliostat mechanism 7 to adjust the angle of the reflecting surface 6 on the basis of angle adjustment data of each reflecting mirror 4, relative to the movement of the sun according to the calendar and true solar time. For example, the heliostat mechanism's 7 internal angle adjustment data could be used.

This eliminates the sequential calculation of reflecting surface angles according to the position of the sun required by conventional technologies, simplifying the system and making it possible to rapidly adjust for the movement of the sun. Adjustments can be made with high precision, and control costs are reduced.

The alignment process is especially useful during the installation of the solar heat collecting apparatus 101, especially after the reflecting mirrors 4 and the receiver 5 are set up. With the present invention, the installation of the reflecting mirrors 4 does not require that much precision, making it relatively simple compared to conventional technologies. This makes it possible to reduce construction costs and complexity.

The heat collection process needs only to take place on the basis of the angle adjustment data after adjustment to the ideal angle during the alignment process, which is more convenient method.

The alignment process could take place not only when installing the heat collecting apparatus 101, but also periodically, for example. During the heat collection process, the angle of the reflecting surface 6 is adjusted on the basis of the angle adjustment data and not the actual position of the sun, so when the solar heat collection apparatus 101 has been in service for a long period of time, it may be periodically inspected to determine whether reflecting surface angles are appropriate and adjust as needed. With this sort of periodic inspection, it is possible to prevent the loss of heat collection efficiency by readjusting any reflecting surfaces 6 that may not be at an appropriate angle due to problems with the equipment, etc. This makes stable operation possible.

<Third Embodiment>

Moreover, another example of the solar heat collecting apparatus of the present invention is described as follows.

This example of the solar heat collecting apparatus of the present invention incorporates a different embodiment of the receiver shown in FIG. 1.

Here the cavity receiver consists of a hollow long box equipped with one or more heat reception tubes, wherein an upper wall and side walls attached to and extending downward from the upper wall enclose the one or more heat reception tubes, and longer side walls among the side walls are positioned diagonally toward the inside of the box so that the bottom of the long box is constricted, with an aperture in this constricted bottom, and the long box is positioned with its long side parallel to the east-west direction, and the sunlight reflected from the plural reflecting mirrors is introduced into the long box and onto the heat reception tubes via the aperture to collect solar heat in the heat reception tubes.

Because the constricted bottom portion of this cavity receiver forms an aperture, in other words, there is a constricted aperture, the sunlight that is reflected into the long box can be further reflected off the internal walls of the long box, and prevented from diffusing outside the long box. Thus, the escape of solar heat from the long box is curbed, making it possible for the heat reception tubes inside the box to collect heat efficiently.

A detailed description follows.

Figure 12:
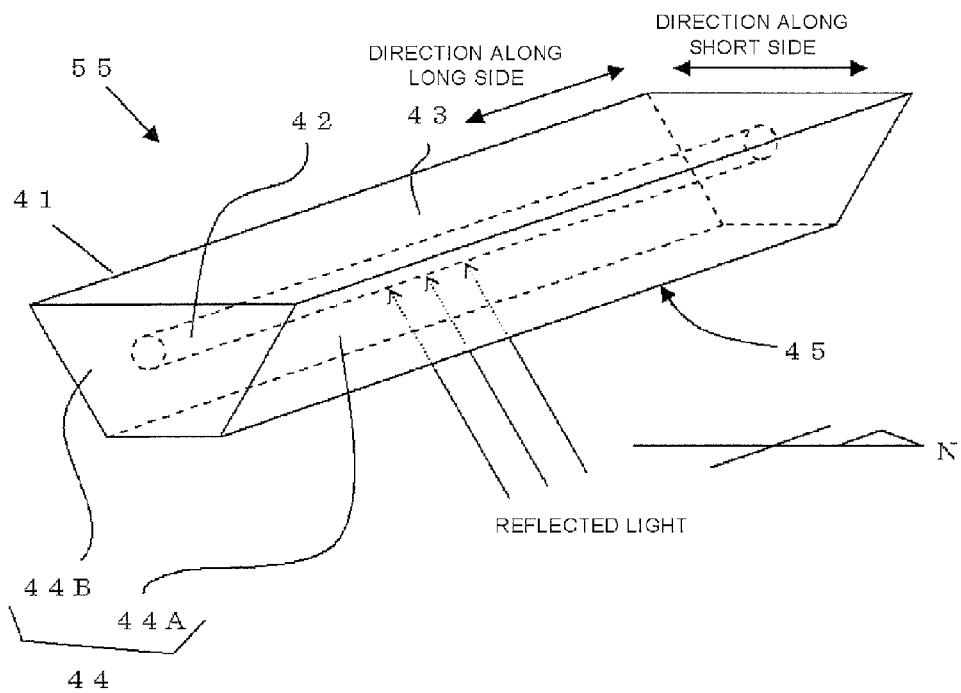
FIG. 12 is a schematic diagram showing an example of a cavity receiver.

This heat collecting apparatus receiver is a cavity receiver. The description of this receiver 55 refers to FIG. 12. FIG. 12 shows an example of the receiver 55, equipped with a long box 41 and one or more heat reception tubes 42. The long box 41 is hollow, with a top wall 43 and side walls 44 (long side walls 44A and short side walls 44B). The edges of the side walls 44 are connected to the top wall 43, and the side walls 44 extend downward. There is an aperture 45 formed in the bottom of the long box 41. Each heat reception tube 42 is inside the long box 41, formed by the top wall 43 and side walls 44.

The long box 41 is positioned with its long side parallel to the east-west direction, and the sunlight reflected by the reflecting mirrors is introduced into the long box 41 via the aperture 45 and onto each heat reception tube 42 to collect heat in each heat reception tube 42.

The long box is described as follows.

Figure 13:
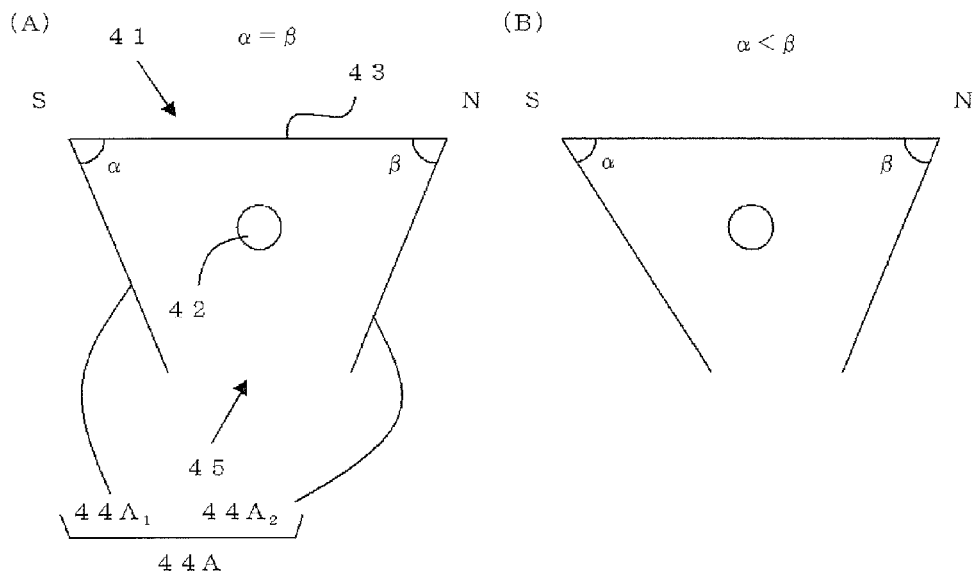
FIG. 13 are cross-section views of long box.

FIG. 13 shows side cross-section views of the long box 41. FIG. 13 show the relationships between the top wall 43 and the two long side walls 44A. The two long side walls 44A are each positioned diagonally toward the inside of the long box 41. For this reason, the shape of the long box 41 is constricted toward the bottom. The aperture 45 is formed by this constricted bottom area.

Because the long box 41 is more constricted at the aperture 45 than at the top (top wall 43), even if sunlight that is reflected into the long box 41 is further reflected on the inside walls of the long box 41, it is difficult for this sunlight to diffuse outside the long box 41. Because it is difficult for the sunlight reflected on the inside walls to escape to the outside, solar heat can be efficiently collected in the long box 41 and also the heat reception tubes 42.

As the long box 41 is positioned with its long side parallel to the east-west direction as described above, one of the two long walls 44A will face the south (side wall 44A$_1$), and the other will face the north (side wall 44A$_2$). Taking α as the angle between top wall 43 and side wall 44A$_1$, and β as the angle between top wall 43 and side wall 44A$_2$, the side walls 44A$_1$ and 44A$_2$ could be positioned such that α and β are equal, as shown in FIG. 13(A).

Side walls 44A$_1$ and 44A$_2$ could also be positioned so that α is smaller than β, as shown in FIG. 13(B).

The configuration that will most efficiently collect sunlight under the conditions in question can be selected.

Figure 14:
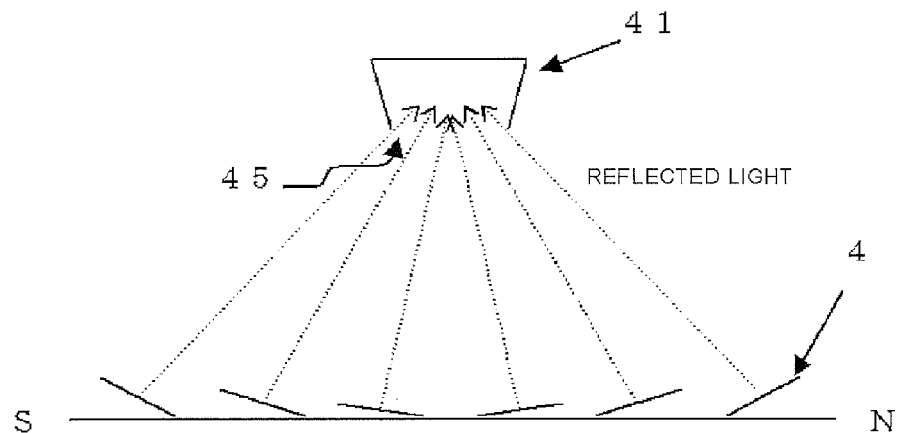
FIG. 14 are explanatory diagrams showing the positional relationship between the plural reflecting mirrors and the long box.
Figure 14:
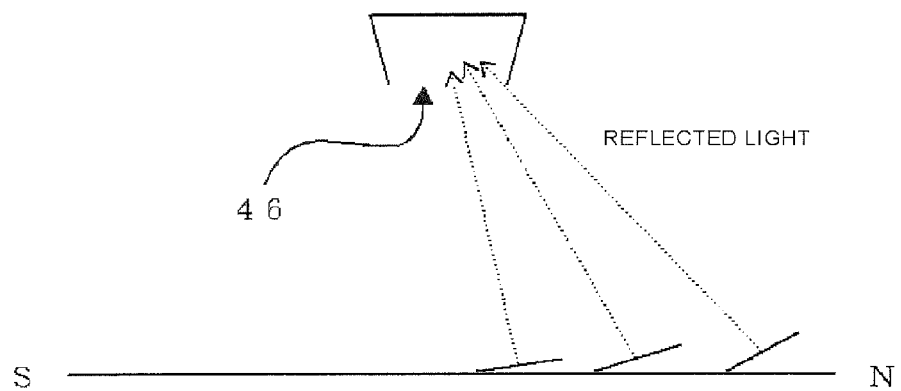
Figure 14:
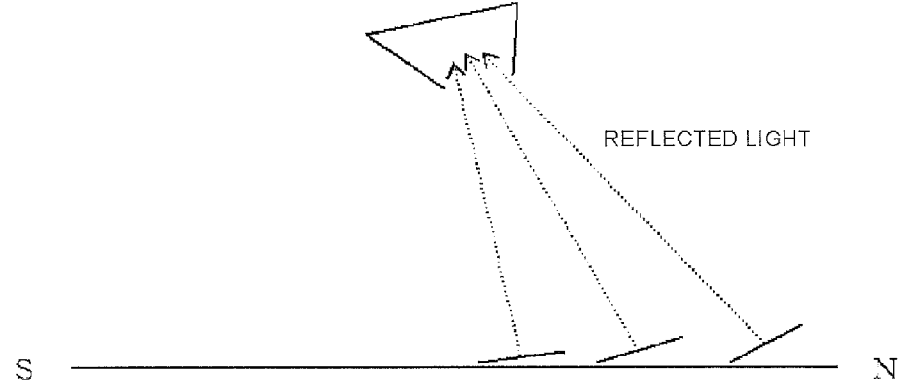

The use of the long box 41 is further described with reference to the positional relationship between the plural reflecting mirrors 4 and the long box 41 shown in FIG. 14.

As shown in FIG. 14(A), when the reception line and the long box 41 on the reception line are positioned above the center of the line of the plural reflecting mirrors 4, the use of a configuration like that shown in FIG. 13(A), for example, is preferable. This is because reflected light from the reflecting mirrors 4 positioned both to the north and to the south of the long box 41 will be collected.

FIGS. 14(B) and 14(C), on the other hand, show the long box 41 positioned to the south of the plural reflecting mirrors 4. Positioning the long box 41 to the south of the reflecting mirrors 4 is effective for reflecting sunlight to collect heat, particularly for the northern hemisphere.

With the positional relationship shown in FIGS. 14(B) and 14(C), the plural reflecting mirrors 4 are positioned to the north of the long box 41. In other words, the southernmost end of the reflecting mirrors is positioned further north than the southernmost end of the reflecting mirrors in FIG. 14(A).

If a configuration such as that shown in FIG. 13(A) were used with the arrangement shown in FIG. 14(B), there would be areas at the south side of the aperture 45 where sunlight would not be reflected into the long box 41. In other words, there would be a gap 46 between the spot at which reflected light from the southernmost reflecting mirror would be introduced into the aperture 45 and the end of the southern long side wall.

With this arrangement, as shown in FIG. 14(B), the gap 46 is eliminated by the use of a configuration such as that shown in FIG. 13(B). In order to prevent heat from escaping from the long box 41 for effective heat collection, naturally, the aperture 45 is preferable to be small, and it is preferable that there is no gaps 46.

As shown in FIG. 14(C), it is also possible to position the long box 41 on a slant to adjust for the introduction of the reflected light.

Figure 15:
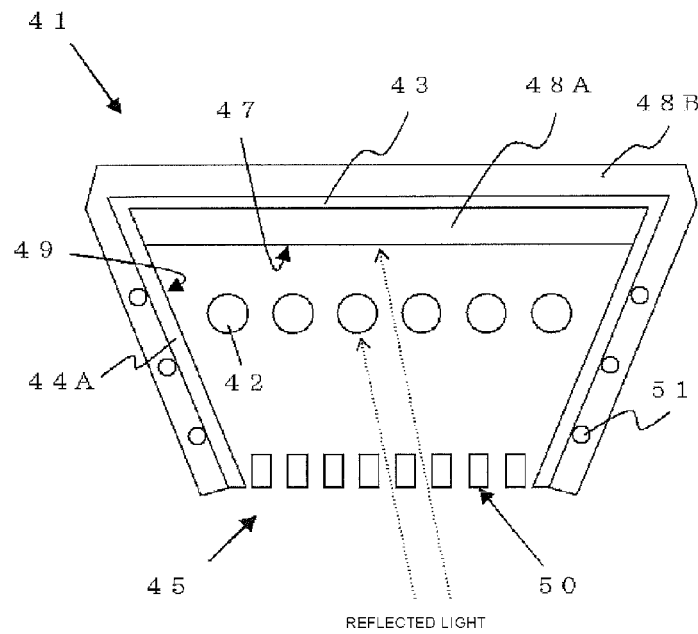
FIG. 15 is a schematic diagram showing an example of the parts of the long box.

The components of the long box 41 are shown in FIG. 15. The heat reception tubes 42 are also shown in FIG. 15.

As shown in FIG. 15, the inside of the top wall 43 features a sunlight absorbing surface 47. This sunlight absorbing surface 47 is positioned behind the heat reception tubes 42 when viewed from the aperture 45.

Reflected sunlight that is introduced into the long box 41, but does not directly radiate onto the heat reception tubes 42, is radiated onto the inside of the top wall 43 behind the heat reception tubes 42. Even though the aperture 45 is constricted, this light could reflect off of the inside of the top wall 43 and escape from the long box 41 through the aperture 45. However, if there is a sunlight absorbing surface 47 such as that shown in FIG. 15, the reflected light that is not directly radiated onto the heat reception tubes 42 can be absorbed, and the amount of light lost through the aperture 45 can be reduced.

There is no particular requirement for the composition of the sunlight absorbing surface 47, as long as it absorbs sunlight well (for example, with an absorption rate of about 0.6 or 0.7 or greater), and materials such as black ceramic can be used.

To prevent heat absorbed by the sunlight absorbing surface 47 from escaping through the top wall 43, heat insulation material 48A can be placed between the composition of the sunlight absorbing surface 47 and the top wall 43. Materials such as aluminum blankets, aluminum wool, and glass wool, etc., could be used as the heat insulation material 48A. The material of the heat insulation material 48A can be selected as appropriate on the basis of weight and heat resistance, etc.

It is also possible for the inner surface of the long side wall 44A to have an infrared reflecting surface 49.

Reflected light is introduced from the reflecting mirrors into the long box 41, but because the aperture 45 is constricted, it is difficult for it to directly reach the inner surface of the long side walls 44A. However, as described above, some of the reflected light that enters the long box 41 will be radiated onto the sunlight absorbing surface 47 of the inside of the top wall 43. The sunlight absorbing surface 47 then generates infrared radiation (heat energy radiation). This re-radiation increases in intensity as the temperature increases, and high amounts of heat energy are radiated.

With the above infrared reflecting surface 49, it is possible to reflect the infrared rays that are re-radiated from the sunlight absorbing surface 47 to the heat reception tubes 42. This further heats the heat reception tubes, thus further increasing heat collection efficiency.

There are no particular requirements as to the composition of the infrared reflecting surface 49, and materials such as mirror-finish stainless steel or white ceramic could be used. As long as it efficiently reflects infrared rays, it can be selected as appropriate on the basis of heat resistance, etc.

It is also possible to provide a ceramic honeycomb 50 inside the long box 41, or at the aperture 45. FIG. 15 shows an example in which this is positioned at the aperture 45, but when it is used inside the long box 41, it is positioned between the aperture 45 and the heat reception tubes 42.

The honeycomb-shaped material is comprised of through-holes through which reflected light from the reflecting mirrors passes to be radiated onto the heat reception tubes 42. Some of the reflected light will be radiated onto the ceramic honeycomb 50. The ceramic honeycomb 50 absorbs the reflected light and can radiate infrared rays toward the inside of the long box 41 and the heat reception tubes 42 for further heating.

Further, the ceramic honeycomb 50 can prevent all of the reflected light from radiating onto the heat reception tubes 42 and overheating them, protecting the heat reception tubes 42 from heat damage.

It can also reduce the loss of heat from the long box 41 to the outside.

The placement of the ceramic honeycomb 50 can be considered in relation to the materials of the heat reception tubes 42 in mind, and set in a way that will allow the heat reception tubes 42 and the inside of the long box 41 to heat to the desired temperature.

The outer surface of the long box 41 is covered by a heat insulator 48B. By covering with the heat insulator 48B, heat loss from the top wall 43 and side walls 44 of the long box 41 can be inhibited.

The heat insulator 48B could be made of such materials as aluminum blankets, aluminum wool, or glass wool, etc. It can be selected as appropriate based on weight and heat resistance.

The long side walls 44A can also have pipes 51 through which a medium flows. By having a high-temperature medium (such as air, etc.) flow through the pipes 51, the inside of the long box 41 can be preheated. Pre-heating makes it possible to heat the heat reception tubes 42 with greater efficiency. Pre-heating can raise the temperature level of the inside of the long box 41 and the heat reception tubes 42, so that when reflected sunlight enters the long box 41, the heat reception tubes 42 can be heated to a higher temperature than they would reach without such pre-heating.

These pipes 51 can also prevent the overheating of the infrared reflecting surface 49 on the inner surface of the long side walls 44A. For example, when the long box 41 is preheated by the pipes 51, it allows the reflected light entering the long box 41 to heat it to higher temperatures, but it is conceivable that these higher temperatures could result in the corrosion or degradation of the composition of the infrared absorbing surface 49. By having a medium flow continuously through the pipes 51, however, it is conversely possible to remove excess heat from the infrared reflecting surface 49 to the outside via the pipes 51. This can keep the area around the long side walls 44A from overheating, and prevent degradation of the infrared absorbing surface 49.

Regarding the aperture 45 at the bottom of the long box 41 is described as follows. As long as there is one or more apertures 45, there is no particular requirement as to their number. There is no particular requirement as to their size. The number and the size can set as needed to allow the reflected light from the reflecting mirrors to efficiently enter the long box 41. The width of the aperture 45 along the length of the long box 41 can be determined according to the number of the reflection lines, etc., and the width of the aperture 45 along the short side of the long box 41 can be about 20 cm to 1 m, for example.

As an example, a single aperture could be formed using the lower edges of the side walls 44A as borders.

Figure 16:
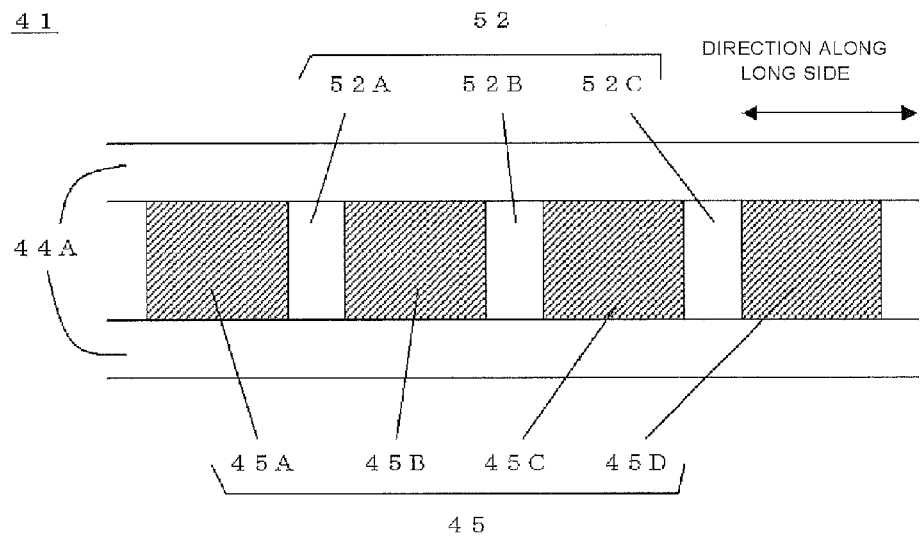
FIG. 16 is a bottom view showing an example of a mode in which plural apertures have been formed on the long box.

An example of plural aperture arrangement is shown in FIG. 16. FIG. 16 shows the bottom view of the long box.

As FIG. 16 shows, plural apertures 45 are formed in the bottom surface of the long box 41. Here the number of apertures is 4 (45A to 45D), but this is not a particular requirement, and the number could be determined as appropriate. In between the apertures are closed covers 52. In FIG. 16, cover 52A is between apertures 45A and 45B, cover 52B is between apertures 45B and 45C, and cover 52C is between apertures 45C and 45D.

Figure 17:
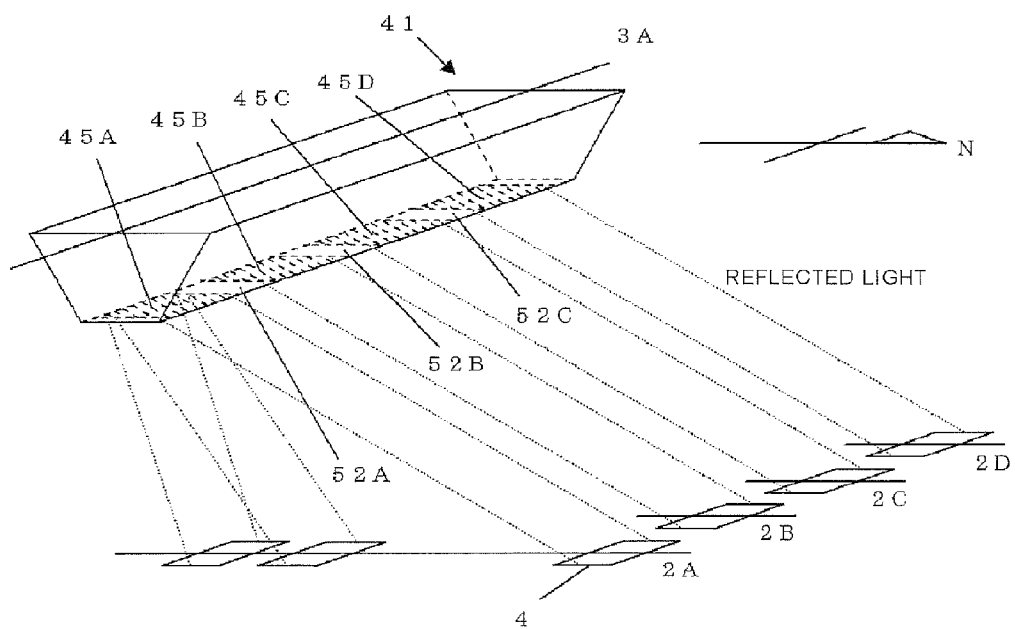
FIG. 17 is an explanatory diagram showing the positional relationship between the plural reflecting lines and the plural apertures on the long box.

FIG. 17 shows the positional relationship between the plural reflection lines and the plural apertures of the long box.

The long box 41 is situated on reception line 3A, and plural reflecting mirrors 4 are on reflection lines 2A to 2D. The plural (here, four) apertures 45A to 45D are arranged so that the plural apertures are set up to correspond one-to-one to the reflection lines (2A to 2D). Thus, for example, reflected light from the reflecting mirrors on reflection line 2A is collected, and enters the long box 41 through aperture 45A, the aperture corresponding to the reflecting mirrors on the reflecting line 2A.

When there is space, for example between the reflecting mirrors on the reflecting line 2A and those on the reflecting line 2B, there will be areas in which there is no reflected light radiated onto the bottom of the long box 41. Here, this area corresponds to the cover 52A between apertures 45A and 45B.

More specifically, if the width of the reflecting mirrors on the reflection lines is 3 m in the east-west direction, and the space between the reflection lines, specifically, the space between the reflecting mirrors in the east-west direction, is 1 m in the east-west direction, the width of the apertures along the long side of the long box 41 could be 3 m, and the width of the cover along the long side could be 1 m.

When the long box 41 has this sort of arrangement of the plural apertures 45 and the covers 52, the areas that the reflected light doesn't radiate onto aren't open, heat is therefore prevented from escaping from the inside of the long box 41 in these areas, so it is possible to heat the heat reception tubes in the long box 41 with greater efficiency. Also, although reflected light is only introduced through the apertures 45, it is possible for parts of the heat reception tubes, which correspond to the position of the covers 52 and the reflected light is not directly radiated onto, to be heated because the long box 41 is hollow inside, and the heat can move back and forth along the long side of the box.

This sort of arrangement, with plural apertures and covers between them, makes it possible to collect solar heat with greater efficiency, because it not only brings reflected light into the long box, it also prevents unnecessary heat loss from the long box.

The heat reception tubes 42 inside the long box 41 are described as follows.

There is no particular requirement as to the number of the heat reception tubes 42, as long as there is one or more. The number can be decided as needed, based on such considerations as the capacity of the long box 41, the size of the apertures 45, and the reflected light projection range, etc. There are no particular requirements as to the diameter of the tubes, either, and tubes with an outer diameter of 3 cm, for example, could be used. There is no particular requirement for the space between the heat reception tubes 42, and they could be spaced about 1 cm apart, for example.

Figure 18:
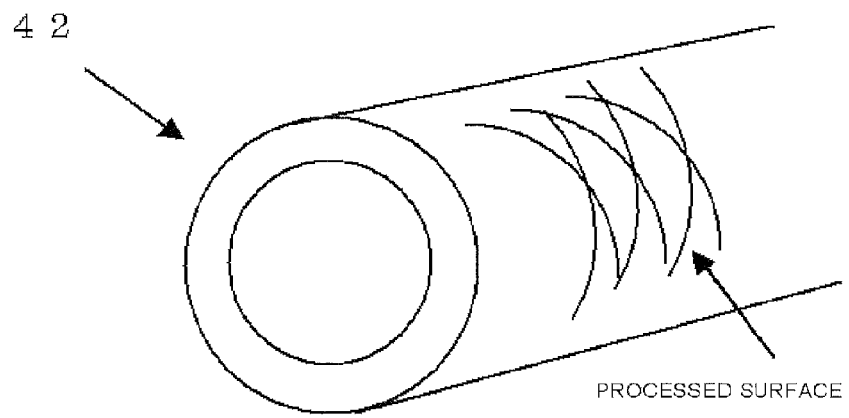
FIG. 18 are schematic diagrams of examples of a heat reception tube.
Figure 18:
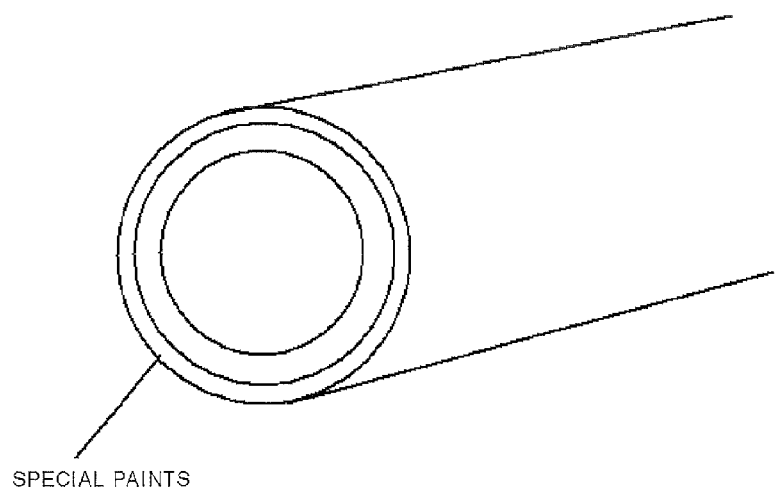

In order to absorb solar light efficiently, the sort of device shown in FIG. 18 is preferred.

FIG. 18(A) shows an example of a heat reception tube with a treated surface. The surface can be processed in a variety of ways, including, for example, as a honeycomb, with plural channels, or with indentations.

As shown in FIG. 18(B), it is also possible to treat the surface with a coating. Paints that are specialized for solar light absorption, such as Pyromark 2500, could be used.

It is also possible to combine both types of treatment.

With such a treatment as above, it is possible to achieve absorption rates of 0.4 or more, and as high as 0.6 to 0.8 or more.

A medium flows through the heat reception tubes 42. This internal medium could be air or carbon dioxide, for example. Reflected light is radiated onto the heat reception tubes 42, solar heat is collected, the medium inside the tubes is therefore heated, and this heated medium is transported to a steam turbine (not shown).

With the solar heat collecting apparatus 1 of the present invention, it is possible to collect heat with much greater efficiency than conventional Fresnel type apparatuses, etc. For example, where Fresnel type apparatuses, etc. could not heat the medium inside the heat reflection tubes to 500° C., with the present invention, it is possible to heat them to over 700° C.

<Fourth Embodiment>

Furthermore, another example of the solar heat collecting apparatus of the present invention is described as follows.

This example of the solar heat collecting apparatus of the present invention incorporates a different embodiment of the receiver shown in FIG. 1.

This is a cavity receiver, consisting of a receiver body that includes an aperture for sunlight reflected from the plural reflecting mirrors described above to enter the receiver, and a grid structure at the aperture, and one or more heat reception tubes in the space surrounded by the grid structure and the receiver body, where reflected sunlight passes through the grid structure to radiate onto the heat reception tubes, making it possible to heat the medium inside the tubes to 550° C. or more.

With this sort of configuration, the grid structure effectively prevents the heat energy that is re-radiated from the heat reception tubes and heat medium that have been heated to 550° C. or more from being released to the outside. It is possible to keep the heat energy inside the receiver, making it possible to improve heat collection efficiency.

The details of this configuration are as follow.

The cavity receiver 65 of this heat collecting apparatus is shown described with reference to FIG. 19.

First, the overall structure of the receiver 65 is described as follows. As shown in FIG. 19, the receiver 65 is comprised of the receiver body 61, the grid structure 62, and the heat reception tubes 42 that contain heat medium 63. The receiver body 61 of the receiver features the aperture 75 for introducing light reflected from the reflecting mirrors 4 into the receiver, and this aperture 75 is equipped with the grid structure 62. Heat reception tubes 42 are positioned in the space between the receiver body 61 and the grid structure 62, and the heat medium 63 inside the heat reception tubes is heated by the reflected light that passes through the grid structure 62 at the aperture 75 into the receiver.

Figure 19:
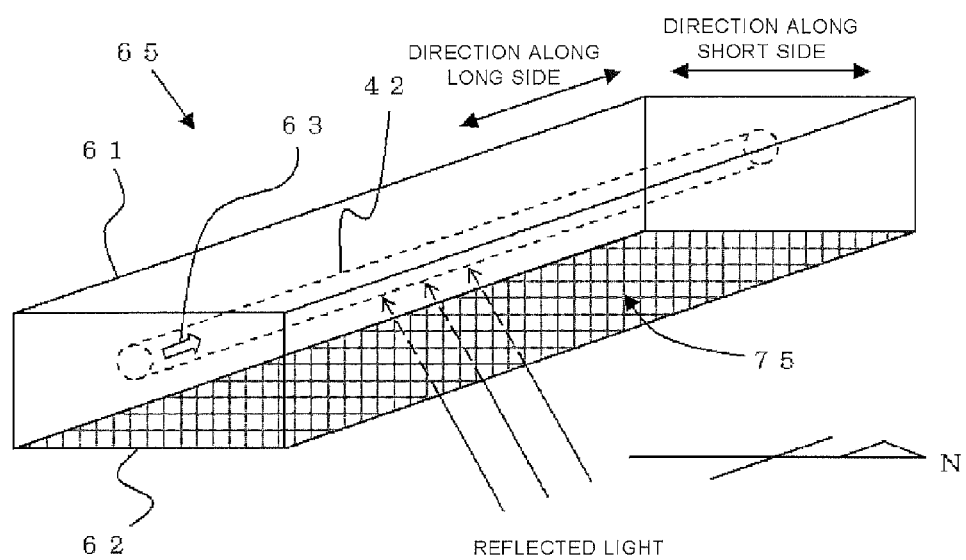
FIG. 19 is a schematic diagram showing another example of a cavity receiver.

The overall shape of the receiver, as shown in FIG. 19, is, for example, long and thin, and when the receiver 65 is installed on the reception line 3, it is positioned so that its long side follows the east-west direction. In this case, the short side follows the north-south direction.

The receiver body 61 is described as follows.

Figure 20:
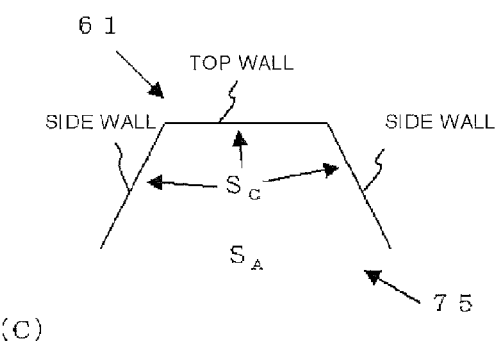
FIG. 20 are cross-section views of a receiver body.
Figure 20:
Figure 20:
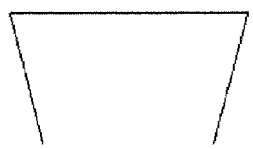
Figure 20:
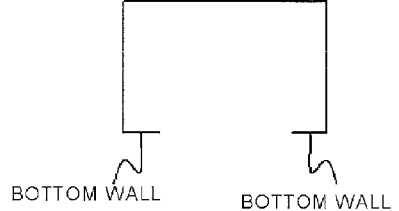
Figure 20:
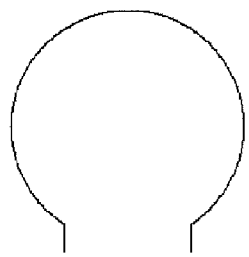
Figure 20:
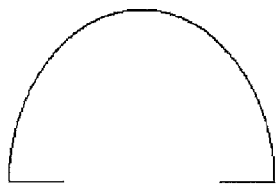

There are no particular requirements as to the shape of the receiver body 61, as long as it is a cavity receiver with the aperture 75 at the bottom, etc. Examples of the receiver body 61 are shown in FIG. 20. FIGS. 20(A) to 20(F) show cross sections of the receiver body 61. All of these are hollow inside, with an aperture 75 at the bottom.

In FIG. 20(A), there are a top wall and side walls that are connected to and extend downward from the ends of the top wall. The side walls extend diagonally towards the outside.

In FIG. 20(B), the side walls extend downward from the top wall at a 90 degree angle.

In FIG. 20(C), the side walls extend diagonally toward the inside.

In FIG. 20(D), in contrast with FIG. 20(B), the bottom wall extends from the edges of the side walls and perpendicular to the side walls to cover a portion of the bottom surface.

FIG. 20(E) shows an upside-down flask shape.

FIG. 20(F) shows a semicircular wall with a bottom wall that extends from the edges of the semicircular wall to cover a portion of the bottom surface.

As described in the examples here, there are many different shapes for the receiver body 61, but in particular, the ratio ($S_C/S_A$) of the surface area ($S_C$) of the inside of the receiver body 61 to the area ($S_A$) of the aperture can be 4 to 10. A ratio of 8 is preferable. This makes it difficult for heat energy to escape from the aperture, making it possible to efficiently heat the inside of the receiver body. Thus the heat medium 63 in the heat reception tubes 42 can be heated more effectively, increasing heat collection efficiency.

There is no particular requirement for the ratio $S_C/S_A$ to be 4 to 10. The receiver body 61 could of course have a shape with a different ratio $S_C/S_A$. This can be determined as appropriate, based on the cost of constructing the receiver body 61, installation conditions, and the target heating temperature of the heat medium, etc.

The grid structure 62 is described as follows.

There are no particular requirements as to the form of the grid structure, as long as reflected light can pass through the spaces of the grid into the receiver body 61. A structure that allows reflected light to effectively enter the receiver body 61 while making it difficult for re-radiation and heat energy from the inside of the receiver body 61 to escape to the outside is preferable. The thickness of the grid and the size of its spaces, etc. can be determined as appropriate.

There is no particular requirement as to the materials used, and these can be selected as appropriate. For example, a ceramic material could be used. With a ceramic material, the reflected light will also heat the grid structure 62 itself, and it can emit infrared radiation in the direction of the inside of the receiver body 61 and the heat reception tubes 42 to heat those elements as well.

In the present invention, because the aperture 75 is equipped with this sort of grid structure 62, it is possible to effectively prevent heat energy resulting from re-radiation from the heat reception tubes 42 and the heat medium 63 that have been heated to 550° C. or more from escaping to the outside through the aperture 75.

Figure 21:
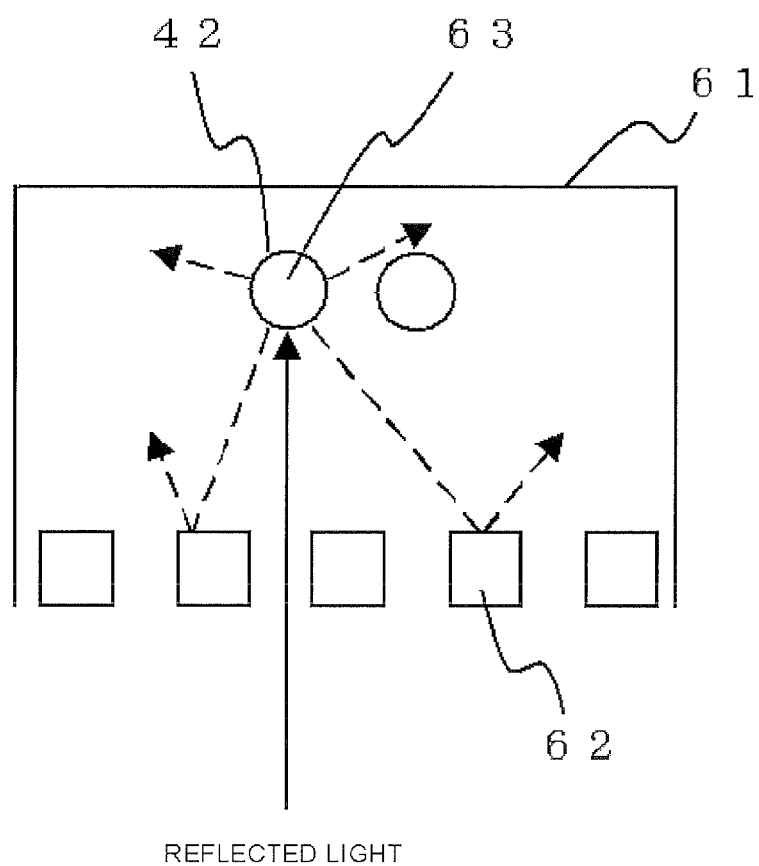
FIG. 21 is an explanatory diagram of the mechanism to prevent heat energy leakage to the outside, using grid structure.

The mechanism by which the grid structure prevents heat energy from flowing to the outside is shown in FIG. 21. As shown in FIG. 21, the heat reception tubes 42 etc. emit re-radiation in various directions. Some of this re-radiation will be emitted in a direction that is parallel to the spaces in the grid structure 62 so that it can escape, but most of it will be blocked by the grid structure, making it possible to keep the heat energy inside the receiver body 61.

In this way, the grid structure makes it possible to both introduce the reflected light into the receiver body 61 to project onto the heat reception tubes 42, and also to inhibit heat energy loss caused by re-radiation from the heated heat reception tubes 42 etc. to the outside.

The heat reception tubes 42 that are arranged within the space between the receiver body 61 and the grid structure 62 are described as follows.

There are no particular requirements as to the number of the heat reception tubes 42, as long as there is one or more. The number can be decided as appropriate, based on the capacity of the receiver body 61, the size of the aperture 75, and the reflected light projection range, etc. There are no particular requirements as to the diameter of the tubes, either, and tubes with an outer diameter of 3 cm, for example, could be used. There is no particular requirement as to the spaces between heat reception tubes 42, and they could be spaced about 1 cm apart, for example.

The heat medium that flows through the heat reception tubes 42 could be air or carbon dioxide, for example. Reflected light is radiated onto the heat reception tubes 42, solar heat is collected, the heat medium 63 inside the tubes is heated, and this heated medium 63 is transported to a steam turbine (not shown).

The method by which solar heat is collected using the solar heat collecting apparatus of the fourth embodiment of the present invention is described as follows.

The plural reflecting mirrors 4 are equipped with the heliostat mechanism 7 installed on the plural reflection lines 2 that are arranged parallel to the north-south direction as shown in FIGS. 1 and 19, and the single cavity receiver 65 is installed on each of the one or more reception lines 3 that are arranged in a fixed position orthogonal to the reflection lines 2 (i.e., in the east-west direction). Using this cross-linear type system to collect heat, it is possible to efficiently heat the heat medium 63 in the heat reception tubes 42, and it is easy to achieve temperatures 550° C. or more and even 700° C. or more.

Here, the receiver 65 comprised of the receiver body 61 in which the aperture 75 is formed, as shown in FIG. 19, the grid structure 62 positioned at the aperture, and equipped with the one or more heat reception tubes 42 in the space between the receiver body 61 and the grid structure 62, is installed on the reception line 3.

The receiver body 61 can be in any of the configuration examples shown in FIG. 20, but it is not limited to these configurations, and can be selected as appropriate. It can be selected on the basis of the ratio ($S_C/S_A$) described above, which could be 4 to 10, or preferably 8. This makes it easy to hold heat energy in the receiver body 61, and makes it possible to efficiently heat the inside of the receiver body.

Having the grid structure 62 at the aperture 75 makes it possible to both introduce the reflected light through the spaces in the grid into the receiver body 61, and also prevent heat energy resulting from re-radiation from the heat reception tubes 42 and the heat medium 63 that have been heated to high temperatures from escaping to the outside through the aperture 75. This improves heat collection efficiency more.

Regarding the actual heat collection process, sunlight is reflected toward the receiver 65 while adjusting the angle of the reflecting surface 6 of the reflecting mirrors 4 with the heliostat mechanism 7, and the reflected light passes through the grid structure 62 into the receiver body 61 and is radiated onto the heat reception tubes 42. Through this process, the heat medium 63 inside the heat reception tubes 42 can be heated to temperatures of 550° C. or more.

Because the present invention can heat the heat medium 63 to high temperatures 550° C. or more or further, 700° C. or more, the re-radiation from the heat medium 63 is much stronger than it would be at temperatures less than 550° C. Using conventional methods, the heat energy from this re-radiation would escape through the aperture to the outside. With the present invention, however, the grid structure 62 on the aperture 75 described above makes it possible to drastically reduce this sort of heat energy loss, and improve heat collection efficiency. The higher the temperature is, the stronger the infrared radiation becomes, so at very high temperatures, for example, 700° C. or more, this embodiment of the present invention is especially effective.

EXAMPLE

Hereinafter, the present invention will be more specifically described with reference to examples and comparative examples, but is not limited thereto.

Example 1

A simulation was performed in which solar heat was collected to heat a medium inside heat reception tubes, using a cross linear type solar heat collecting apparatus such as that shown in FIG. 1. Simulation conditions were set as follows:

A single reception line, with a receiver installed at a height of 20 m from the ground, and 80 reflection lines (separated by a distance of 1.5 m) with 30 reflecting mirrors (1.5 m×1.5 m) on each line (total reflecting mirror area: 5,400 m$^2$).

The reflecting mirrors were all positioned to the north of the receiver. The closest edge of the reflecting mirror positioned nearest to the receiver was 5 m from the receiver in a horizontal direction.

The angle of the reflecting mirrors was adjusted using the east-west angle adjustment unit and the north-south angle adjustment unit of FIG. 1. Based on the internal angle adjustment data of each reflecting mirror, relative to the movement of the sun according to the calendar and true solar time, the rotation of the rotating rings, the back-and-forth motion of the rotational arms of the rotational actuators of the fine-tuning unit, and the back-and-forth motion of the arm of the actuators were controlled to adjust the angle of the reflecting mirrors.

Other conditions were as follows:

Blocking (the blocking of reflected light by nearby reflecting mirrors was set at 0 to 0.2 (i.e., less than 20% or less).

The time and place were set to 10:00 on the vernal equinox at declination of 36.8401632 degree (Almeria, Spain).

Comparative Example

A simulation was performed using a conventional linear Fresnel type solar heat collecting apparatus (12 reflecting lines and a reception line all arranged in the north-south direction) to collect sunlight to heat the medium inside the heat collection tubes. The simulation conditions were set as follows:

12 reflecting mirrors of 1.5 m in width and 300 m in length (6 to the north and 6 to the south of the receiver), for a total reflecting mirror area of 5,400 m$^2$, as in example 1.

The reflecting mirrors were spaced at 1.5 m apart, so that the rate of blocking would be about the same as that of example 1.

Time and place were the same as example 1.

The results of the simulation show that the average cosine effect for all of the reflecting mirrors was 0.799, showing that about 80% of the reflecting mirrors effectively collected light.

Example 2

The same sort of solar heat collecting apparatus as that of example 1 was used, but with no fine-tuning unit of the east-west angle adjustment unit. Unlike example 1, only the rotation of the rotating rings and the back-and-forth motion of the arm of the actuators were controlled to adjust the angle of the reflecting mirrors to collect sunlight and heat the medium in the heat reception tubes in this simulation.

The results of the simulation show that the average cosine effect for all of the reflecting mirrors was 0.941 (1.00 when reflecting mirror use efficiency is 100%), making it clear that almost all of the reflecting mirrors are effectively used to collect light.

A comparison of example 2 and the comparative example shows that light collection efficiency per mirror was 14% higher for example 2. This difference changes depending on latitude and time, and differences of more than 40 to 80% or more are seen. The present invention makes it possible to reduce the number of reflecting mirrors and heliostats, reducing plant construction costs.

The results of the example 1, example 2 and comparative example simulations show that the light collection efficiency and heat collection efficiency for example 1, an example of the present invention, are 20% higher than those of comparative example. Light collection efficiency and heat collection efficiency for example 1 were 4% higher than those of example 2.

In this way the present invention makes it possible to collect sunlight and solar heat with greatly higher efficiency than conventional solar heat collecting apparatuses.

Example 3

A simulation was performed in which solar heat was collected to heat a medium inside heat reception tubes, using a cross linear type solar heat collecting apparatus such as that shown in FIG. 1. Simulation conditions were set as follows:

A single reception line, with a receiver installed at a height of 20 m from the ground, and 80 reflection lines (separated by a distance of 1.5 m) with 30 reflecting mirrors (1.5 m×1.5 m) on each line (total reflecting mirror area: 5,400 m$^2$).

The reflecting mirrors were all positioned to the north of the receiver. The closest edge of the reflecting mirror positioned nearest to the receiver was 5 m from the receiver in a horizontal direction.

The angle of the reflecting mirrors was adjusted using the east-west angle adjustment unit and the north-south angle adjustment unit of FIG. 1. Based on internal angle adjustment data of each reflecting mirror, relative to the movement of the sun according to the calendar and true solar time, the rotation of the rotating rings and the back-and-forth motion of the arm of the actuators 15 were controlled to adjust the angle of the reflecting mirrors.

Other conditions were as follows:

The north-south angle of the slant of the connecting element was adjusted so that the north end was higher than the south end, and thereby a reflecting mirror that is closer to the north end was positioned higher than the one that is closer to the south end, such that blocking would be 0 to 0.2 (i.e., 20% or less).

Time and place were set to the winter solstice at 10:00, 11:00, 12:00, 13:00, and 14:00 at declination of 47.91667 degree (Ulan Bator, Mongolia).

The results of the simulation show that the average cosine effects of all the reflecting mirrors at 10:00, 11:00, 12:00, 13:00, and 14:00 were 0.357 (1.00 when reflecting mirror use efficiency is 100%), 0.459, 0.50, 0.459, and 0.357 respectively, showing that even on the winter solstice at high latitude, it is possible to collect solar energy at 40 to 50% efficiency.

In contrast, using a conventional parabolic trough type, tower type, or linear Fresnel type system with the same time and place settings, the cosine effect is reduced by ½ to ⅓, showing that it is unprofitable to generate electricity using solar heat collection at this sort of high latitude. Thus, electricity was conventionally generated during winter with fuel.

With the present invention, however, it is possible to collect sufficient solar heat to generate electricity even in winter at high latitudes, making it possible to reduce fuel expenses.

Example 4

A simulation was performed in which solar heat was collected to heat a medium inside heat reception tubes, using a cross linear type solar heat collecting apparatus such as that shown in FIG. 7. Simulation conditions were set as follows:

A single reception line, with a receiver installed, and 80 reflection lines (separated by a distance of 1.5 m) with 30 reflecting mirrors (1.5 m×1.5 m) on each line.

In the alignment process, the angle of the reflecting mirrors was adjusted using the east-west angle adjustment unit and north-south angle adjustment unit of FIG. 7. In the heat collection process, based on the internal angle adjustment data of each reflecting mirror, relative to the movement of the sun according to the calendar and true solar time, the rotation of the rotating rings and the back-and-forth motion of the arm of the actuators 15 were controlled to adjust the angle of the reflecting mirrors.

During the alignment process, the image of a reflecting mirror situated 60 m from the receiver was taken using a 4000×2500 pixel CCD camera with a 300 mm telephoto lens and captured in a 36×24 mm shooting area, making it possible to control the angle of the reflecting surface of the reflecting mirror at 0.00001687 radians per pixel.

This range of control makes it possible to adjust the focus of the light collection beam so that displacement is reduced to ⅒ or less, and its effect on sunlight collection efficiency can practically be ignored. The time needed to capture and process images is just a few seconds, and it was possible to complete the reflecting mirror adjustment control within two minutes. These results make it clear that with the present invention, alignment makes it possible to simply adjust plural reflecting mirrors in a short time.

Further, compared with conventional controls based on computer calculations, accuracy is improved.

The present invention is not limited to the above embodiments. These embodiments are merely illustrative, and any other configuration that is substantially the same as and provides the same benefits as the technological ideas described in the claims of the present invention is included in the technical scope of the present invention.

EXPLANATION OF REFERENCE

1, 101 . . . Solar Heat Collecting Apparatus,
2, 2A to 2D . . . Reflection Line,
3, 3A . . . Reception Line,
4, 4A$_1$ to 4A$_5$ . . . Reflecting Mirrors,
5, 55, 65 . . . Receiver, 6 . . . Reflecting Surface,
7 . . . Heliostat Mechanism,
8 . . . East-West Angle Adjustment Unit,
9 . . . North-South Angle Adjustment Unit,
10 . . . Rotating Ring, 11 . . . Frame, 12 . . . Roller,
13 . . . Motor, 14 . . . Arm, 15 . . . Actuator,
16, 36 . . . Central Control Device,
17 . . . Connecting Element, 18 . . . Fine-Tuning Unit,
19 . . . Rotational Component, 20 . . . Rotational Actuator,
21 . . . Rotational Axial Rod, 22 . . . Rotational Arm,
31 . . . Imaging Device,
32 . . . Arithmetic Processing Device,
33 . . . Image Processing Device,
34 . . . CCD Camera, 41 . . . Long Box,
42 . . . Heat Reception Tube, 43 . . . Top Wall,
44 . . . Side Wall, 44A, 44A$_1$, 44A$_2$ . . . Long Side Wall,
44B . . . Short Side Wall,
45, 45A to 45D, 75 . . . Aperture,
46 . . . Gap, 47 . . . Sunlight Absorbing Surface,
48A . . . Heat Insulation Material,
49 . . . Infrared Reflecting Surface,
50 . . . Ceramic Honeycomb, 51 . . . Pipe,
52, 52A to 52C . . . Cover, 61 . . . Receiver Body,
62 . . . Grid Structure, 63 . . . Heat Medium.

What is claimed is:

1. A solar heat collecting apparatus comprised of plural reflection lines and one or more reception lines, wherein
the plural reflection lines are arranged in parallel in a north-south direction; each reflection line is provided with plural reflecting mirrors that reflect sunlight; the plural reflecting mirrors are provided with a heliostat mechanism that causes the plural reflecting mirrors to follow a movement of the sun to adjust an angle of a reflecting surface of the plural reflecting mirrors;
the heliostat mechanism includes an east-west angle adjustment unit, having a rotating ring, to adjust the angle of the reflecting surface of the plural reflecting mirrors in the east-west direction, and a north-south angle adjustment unit, having actuators, to adjust the angle of the reflecting surface of the plural reflecting mirrors in the north-south direction;
the rotating ring is connected to the plural reflecting mirrors via a frame, and the angle of the reflecting surface of the plural reflecting mirrors on each reflection line is simultaneously adjusted via the frame by a rotation of the rotating ring;
the actuators are disposed to correspond one-to-one to the plural reflecting mirrors, each reflecting mirror is connected to an arm of the corresponding actuator, and the angle of the reflecting surface of each reflecting mirror is individually adjusted by a back-and-forth motion of the arm of the corresponding actuator; and,
the one or more reception lines are arranged in an east-west direction in a fixed position above the plural reflection lines, each reception line is provided with one receiver, and the receiver collects heat from the reflected light of the sunlight reflected by the plural reflecting mirrors.

2. The solar heat collecting apparatus according to claim 1, wherein the east-west angle adjustment unit has a plurality of the rotating rings, with each rotating ring fitted with a roller, and a rotation drive of the roller of at least one of the plurality of the rotating rings is motor-controlled.

3. The solar heat collecting apparatus according to claim 1, wherein the arm of the corresponding actuator is attached to the back side of each reflecting mirror, and supports each reflecting mirror.

4. The solar heat collecting apparatus according to claim 1, wherein the rotation of the rotating ring and the back-and-forth motion of the arm of each actuator are controlled on the basis of internal angle adjustment data of each reflecting mirror, relative to a movement of the sun according to the calendar and true solar time.

5. The solar heat collecting apparatus according to claim 1, wherein it is possible for the rotation of the rotating ring and the back-and-forth motion of the arm of each actuator to be centrally controlled.

6. The solar heat collecting apparatus according to claim 1, wherein with reference to the east-west angle adjustment unit, it is possible for the angle of the reflecting surface of each of the plural reflecting mirrors to be individually adjusted in the east-west direction, and with reference to the north-south angle adjustment unit, it is possible for the angle of the reflecting surface of each of the plural reflecting mirrors to be individually adjusted in the north-south direction.

7. The solar heat collecting apparatus according to claim 1, wherein the east-west angle adjustment unit further has fine-tuning units, the fine-tuning units are disposed to correspond one-to-one to the plural reflecting mirrors, and the angle of the reflecting surface of each of the plural reflecting mirrors that has been simultaneously adjusted by the rotation of the rotating ring is individually further fine-tuned according to a position of each reflecting mirror by the corresponding fine-tuning unit.

8. The solar heat collecting apparatus according to claim 1, wherein
the plural reflecting mirrors on each reflection line are supported and connected by a connecting element, and
in the north-south direction, the connecting element is positioned on a slant, with one end relatively higher than the other end, such that the closer to the one end each of the plural reflecting mirrors that are supported by the connecting element is installed, the higher each reflecting mirror is positioned.

9. The solar heat collecting apparatus according to claim 8, wherein the connecting element is positioned on a slant with the north end relatively higher than the south end, such that the closer to the north each of the plural reflecting mirrors that are supported by the connecting element is installed, the higher each reflecting mirror is positioned, or, the connecting element is positioned on a slant with the south end relatively higher than the north end, such that the closer to the south each of the plural reflecting mirrors that are supported by the connecting element is installed, the higher each reflecting mirror is positioned.

10. The solar heat collecting apparatus according to claim 8, wherein the plural reflecting mirrors are positioned at equal distances from each other.

11. The solar heat collecting apparatus according to claim 8, wherein it is possible to rotate the connecting element in the north-south direction, and to adjust the slant angle in the north-south direction.

12. The solar heat collecting apparatus according to claim 1, further comprising:
an imaging device to record each of the plural reflecting mirrors and capture an actual image of each reflecting mirror;
an arithmetic processing device to simulate, from a sun's actual position, an ideal image of each reflecting mirror when the reflecting surface has been adjusted to an ideal angle for reflecting sunlight into the receiver;
an image processing device to compare the actual image and the ideal image of each reflecting mirror and obtain image displacement; and
a central control device that controls the imaging device, the arithmetic processing device, the image processing device and the heliostat mechanism, wherein the heliostat mechanism, based on the image displacement, is controlled by the central control device to adjust the angle of the reflecting surface of each reflecting mirror to the ideal angle, and contains the internal angle adjustment data of each reflecting mirror, relative to a movement of the sun according to the calendar and true solar time, and based on the internal angle adjustment data, adjusts the angle of the reflecting surface of each reflecting mirror that has been adjusted to the ideal angle.

13. The solar heat collecting apparatus according to claim 12, wherein the imaging device is a CCD camera.

14. The solar heat collecting apparatus according to claim 12, wherein the central control device controls the imaging device, the arithmetic processing device, the image processing device, and the heliostat mechanism wirelessly.

15. A solar heat collecting method which includes arranging plural reflection lines in parallel in a north-south direction, each reflection line being provided with plural reflecting mirrors that reflect sunlight, and adjusting an angle of a reflecting surface of the plural reflecting mirrors by a heliostat mechanism to follow the movement of the sun; and
arranging one or more reception lines in an east-west direction in a fixed position above the plural reflection lines, each reception line being provided with one receiver, and collecting heat from reflected light of the sunlight reflected by the plural reflecting mirrors, the solar heat collecting method comprising:
when adjusting the angle of the reflecting surface of the plural reflecting mirrors in the east-west direction by an east-west angle adjustment unit, having a rotating ring, of the heliostat mechanism, connecting the rotating ring to the plural reflecting mirrors via a frame and simultaneously adjusting the angle of the reflecting surface of the plural reflecting mirrors on each reflection line via the frame by a rotation of the rotating ring; and
when adjusting the angle of the reflecting surface of the plural reflecting mirrors in the north-south direction by a north-south angle adjustment unit, having actuators, of the heliostat mechanism, making the actuators are disposed to correspond one-to-one to the plural reflecting mirrors, connecting each reflecting mirror to an arm of the corresponding actuator, and individually adjusting the angle of the reflecting surface of each reflecting mirror by a back-and-forth motion of the arm of the corresponding actuator, and
thereby reflecting sunlight and collecting heat.

16. The solar heat collecting method according to claim 15, wherein with reference to the east-west angle adjustment unit, it is possible for the angle of the reflecting surface of each of the plural reflecting mirrors to be individually adjusted in the east-west direction, and with reference to the north-south angle adjustment unit, it is possible for the angle of the reflecting surface of each of the plural reflecting mirrors to be individually adjusted in the north-south direction.

17. The solar heat collecting method according to claim 15, wherein the east-west angle adjustment unit further has fine-tuning units and the fine-tuning units are disposed to correct one-to-one to the plural reflecting mirrors, and the angle of the reflecting surface of each of the plural reflecting mirrors that has been simultaneously adjusted by the rotation of the rotating ring is individually further fine-tuned according to a position of each reflecting mirror by the corresponding fine-tuning unit.

18. The solar heat collecting method according to claim 15, wherein when reflecting sunlight and collecting heat, the plural reflecting mirrors on each reflection line are supported and connected by a connecting element, and in the north-south direction, the connecting element is positioned on a slant, with one end relatively higher than the other end, such that the closer to the one end each of the plural reflecting mirrors that are supported by the connecting element is installed, the higher each reflecting mirror is positioned.

19. The solar heat collecting method according to claim 18, wherein the connecting element is positioned on a slant with the north end relatively higher than the south end, such that the closer to the north end each of the plural reflecting mirrors that are supported by the connecting element is installed, the higher each reflecting mirror is positioned, or, the connecting element is positioned on a slant with the south end relatively higher than the north end, such that the closer to the south end each of the plural reflecting mirrors that are supported by the connecting element is installed, the higher each reflecting mirror is positioned.

20. The solar heat collecting method according to claim 15, which comprises an alignment process for the angle of the reflecting surface of the plural reflecting mirrors and a heat collection process for the reflected light after the alignment process, wherein the alignment process comprises:
a step in which the plural reflecting mirrors are each recorded by an imaging device and an actual image of each reflecting mirror is captured;
a step in which the ideal image of each reflecting mirror when the reflecting surface has been adjusted to the ideal angle for reflecting sunlight into the receiver is simulated from the sun's actual position in an arithmetic processing device;
a step in which the actual image and the ideal image of each reflecting mirror are compared with an image processing device to obtain image displacement; and
a step in which, based on the image displacement, the angle of the reflecting surface of each reflecting mirror is adjusted by the heliostat mechanism to the ideal angle, and wherein in the heat collection process,
the angle of the reflecting surface of each reflecting mirror that has been adjusted to the ideal angle in the alignment process is adjusted by the heliostat mechanism based on angle adjustment data of each reflecting mirror, relative to a movement of the sun according to the calendar and true solar time, to reflect sunlight and collect heat.

\* \* \* \* \*